United States Patent [19]

Mama et al.

[11] Patent Number: 4,914,459
[45] Date of Patent: Apr. 3, 1990

[54] IMAGE FORMING APPARATUS

[75] Inventors: Takashi Mama, Yokohama; Kenichirou Asada, Tokyo; Takanobu Fujioka, Tokyo; Yoshio Kaneko, Tokyo; Masaaki Kogure, Asaka, all of Japan

[73] Assignee: Ricoh Company, Ltd., Tokyo, Japan

[21] Appl. No.: 338,273

[22] Filed: Apr. 14, 1989

[30] Foreign Application Priority Data

Apr. 18, 1988 [JP] Japan ................................ 63-93593
Apr. 28, 1988 [JP] Japan ................................ 63-104230
May 11, 1988 [JP] Japan ................................ 63-112620

[51] Int. Cl.$^4$ ........................................... G01D 15/00
[52] U.S. Cl. ................................. 346/160; 346/154
[58] Field of Search ............... 346/160.1, 107 R, 108, 346/160, 154; 369/106, 116

[56]  References Cited

U.S. PATENT DOCUMENTS 4,283,785  8/1981  Miyauchi et al. .................... 369/116

*Primary Examiner*—Arthur G. Evans
*Attorney, Agent, or Firm*—Oblon, Spivak, McClelland, Maier & Neustadt

[57]  ABSTRACT

An electrophotographic copier, facsimile machine, laser printer or similar image forming apparatus for reproducing an image on a paper sheet by transforming an image signal representative of the image into an image forming signal by pulse width modulation, causing a spot beam in the form of a laser beam which is modulated by the image forming signal to scan a photoconductive element to form an electrostatic latent image thereon, developing the latent image to render it visible, and transferring the visible image to a paper sheet. The laser beam output, the set pulse widths of the image forming signal (beam turn-on times) and the bias voltage for development are changed in association with the deterioration of the laser beam power and the sensitivity of the photoconductive element.

11 Claims, 38 Drawing Sheets

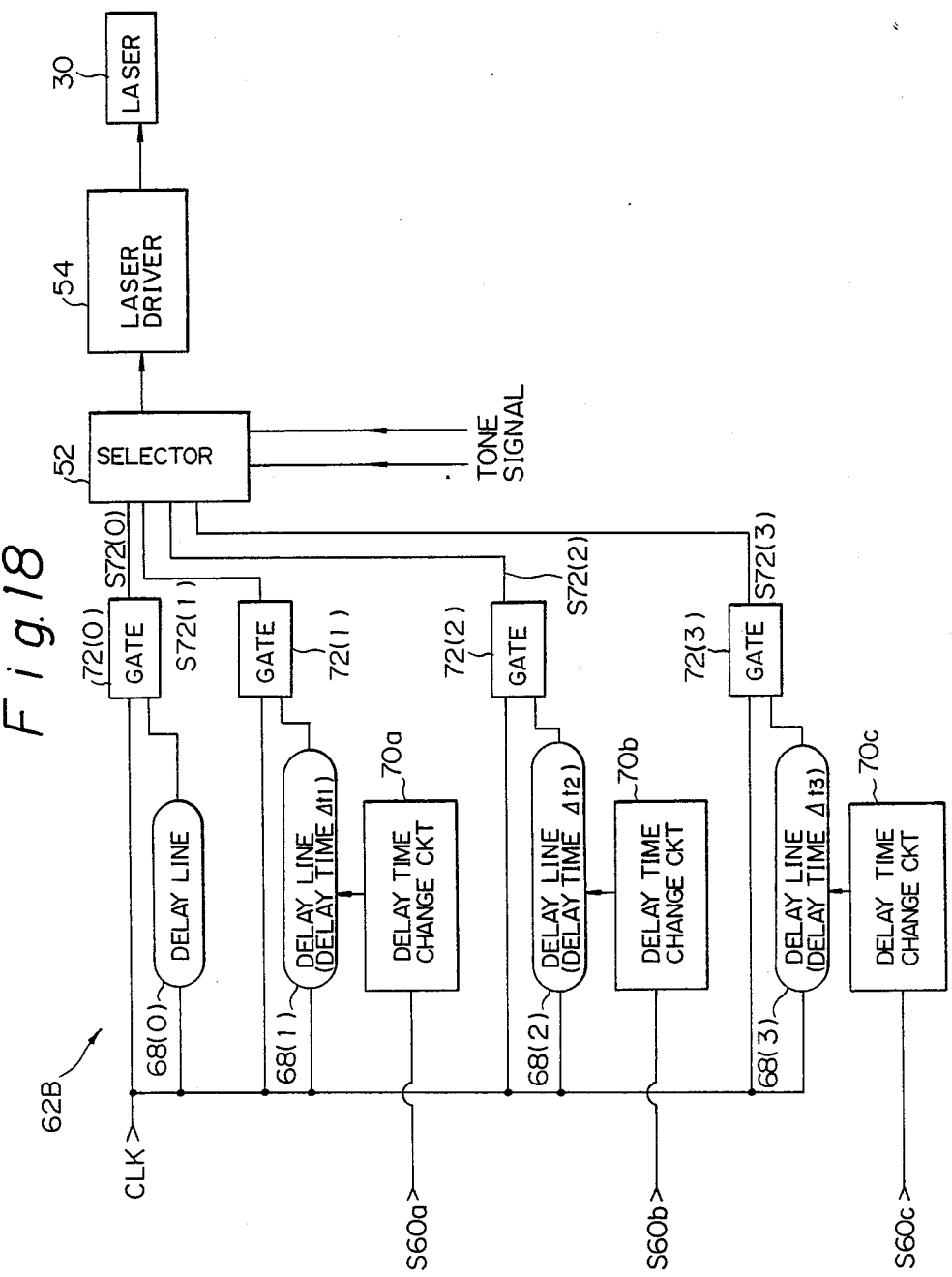

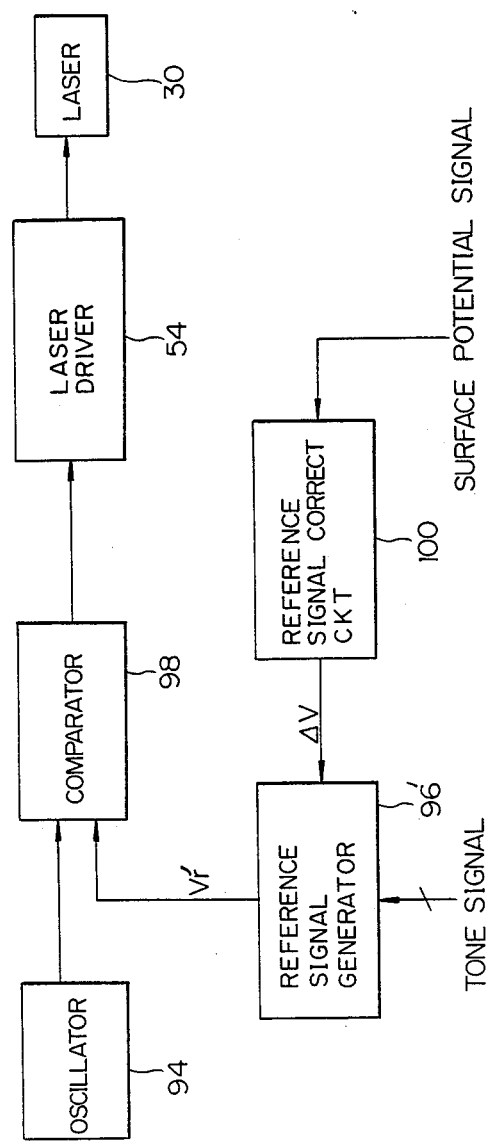

BACKGROUND CONDITION SIGNAL

BACKGROUND CONDITION SIGNAL

BACKGROUND CONDITION SIGNAL

IMAGE FORMING APPARATUS

BACKGROUND OF THE INVENTION

The present invention relates to an electrophotographic copier, facsimile machine, laser printer or similar image forming apparatus which reproduces an image on a paper sheet by transforming an image signal representative of the image into an image forming signal, scanning a photoconductive element with a spot beam in the form of a laser beam being modulated by the image forming signal to form an electrostatic latent image on the photoconductive element, developing the latent image to render it visible, and transferring the visible image to a paper sheet.

An image forming apparatus whose reproducibility is not satisfactory with respect to halftone may reproduce false halftone by using a dither method, density pattern method or similar implementation heretofore proposed (e.g. Japanese Patent Laid-Open Publication (Kokai) No. 57-76977). A predominant procedure for the false reproduction of a halftone image currently practiced is comparing a halftone image signal or light/shade image signal with a threshold signal or dither signal to digitize it with respect to two levels or a plurality of limited levels, and changing the dot size or the dot density. Assuming that the threshold signal is represented by a 4×4 matrix, an image forming apparatus capable of rendering only two levels cannot reproduce more than seventeen tones. This results in a noticeable difference in density between successive tones and therefore in a false contour. Although this problem may be overcome by increasing the matrix, this kind of scheme brings about another problem that the resolution of an image becomes poor.

In an image forming apparatus of the type using a laser beam, to guarantee a satisfactory resolution, one dot of a laser beam or spot beam for illuminating a photoconductive element is subjected to pulse width modulation, i.e., the beam turn-on time per dot is changed to render several different tones by means of one pixel. However, when the power of the laser beam is changed by the deterioration of a laser and the contamination of mirrors, lenses and other components of optics or when the sensitivity of a photoconductive element is changed due to the fatigue of the element itself and the variation of ambient temperature, the area of a dot is changed. This effects the density of an image to be reproduced and degrades the tone characteristic, resulting in poor reproducibility.

A prior art approach available for eliminating the above drawback is to detect the number of times that an image forming apparatus has repeated its operation and the fatigue of a photoconductive element so as to control a bias voltage for development based on the detected values. Although this kind of scheme can uniformly change the overall density distribution (low densities to high densities), it is incapable of changing the tone characteristic. Another approach heretofore proposed in relation to an apparatus of the type using a laser beam is to change the density of an image by changing a laser beam output. While this scheme is of course not capable of offering high image quality constantly, it is advantageous over the previously stated bias voltage scheme in that as the image density is increased due to aging, the laser beam output and therefore the image density is decreased to suppress the fatigue of the photoconductive element.

SUMMARY OF THE INVENTION

It is therefore an object of the present invention to provide an image forming apparatus which eliminates the changes in the tone characteristic and density of an image and thereby guarantees high image quality by changing the laser beam output, the set pulse widths of an image forming signal which modulates the laser beam, and the bias voltage for development in association with the deterioration of laser beam power and that of the sensitivity of a photoconductive element.

It is another object of the present invention to provide a generally improved image forming apparatus.

An apparatus for forming an electrostatic latent image representative of image information and a visible image of the latent image on an image carrier by illuminating the image carrier by a spot beam which is manipulated by an image forming signal associated with the image information of the present invention comprises a sensor for sensing a condition of the image carrier and producing an output signal representative of the sensed condition, an illumination time changing circuit for changing a duration of illumination of the image carrier by the spot beam in response to the output signal of the sensor.

BRIEF DESCRIPTION OF THE DRAWINGS

The above and other objects, features and advantages of the present invention will become more apparent from the following detailed description taken with the accompanying drawings in which:

FIG. 18 is a schematic block diagram showing a specific construction of a pulse width setting circuit shown in FIG. 17;

FIG. 32 is a schematic block diagram of a pulse width setting circuit which is implemented by the control system of FIG. 30;

DESCRIPTION OF THE PREFERRED EMBODIMENTS

To better understand the present invention, the aging of a photoconductive element generally observed will be outlined assuming the use of an OPC photoconductor and a negative-to-positive developing system, i.e., a system which forms a toner image in an exposed portion of the photoconductor.

Figure 1:
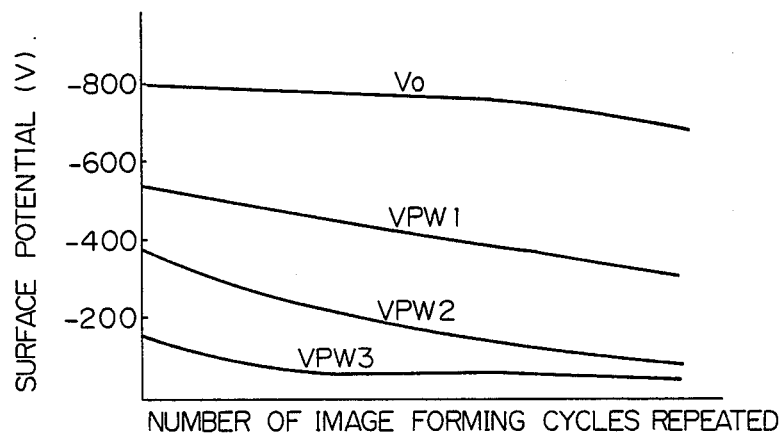
FIG. 1 is a graph showing the deterioration of the surface potential of a photoconductive element due to aging.
Figure 2:
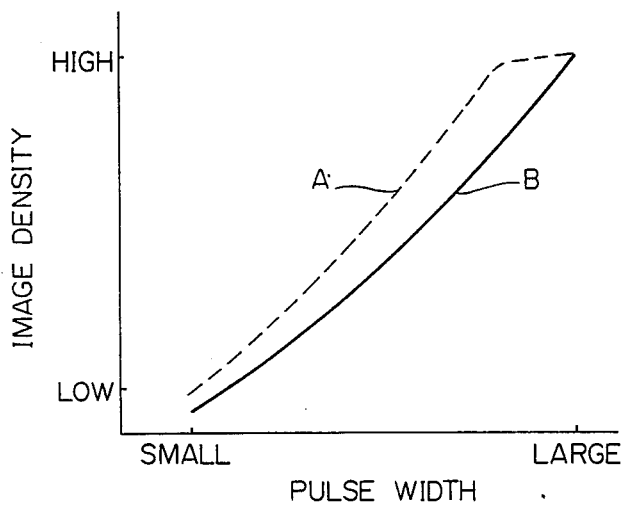
FIG. 2 is a graph showing a tone characteristic of image density.

FIG. 1 shows how the charge potential $V_o$ on a photoconductive element of an image forming apparatus of the type using a laser beam varied as an image forming cycle is repeated. As shown, the charge potential $V_o$ decreases with the increase in the number of times that the image forming cycle is performed. Also shown in FIG. 1 are the variations of potentials VPW1, VPW2, and VPW3 associated respectively with laser beams having pulse widths of PW1, PW2, and PW3 (PW1 < PW2 < PW3) which are used to illuminate the photoconductive element. It will be seen that the potentials VPW1, VPW2 and VPW3 after the imagewise exposure each varies by an amount which is different from the amount of variation of the charge potential $V_o$ specifically, the potentials VPW1 and VPW2 associated with the comparatively small pulse widths PW1 and PW2, respectively, vary by greater amounts than the charge potential $V_o$ (the variation of VPW2 being greater than that of VPW1). The potential VPW3 associated with the comparatively large pulse width PW3 becomes substantially constant from a certain point. As a result, the image densities derived from the laser beams each having a different pulse width differ from an initial stage to an aged stage, as shown in FIG. 2. In FIG. 2, curves A and B are representative of the characteristic at the initial stage and the characteristic at the aged stage, respectively. As shown, the image density sequentially increases due to aging to degrade the reproducibility of tones of an image and therefore the image quality.

The basic construction and operation of an image forming apparatus to which the present invention is applied will be described with reference to FIGS. 3 and 4.

Figure 3:
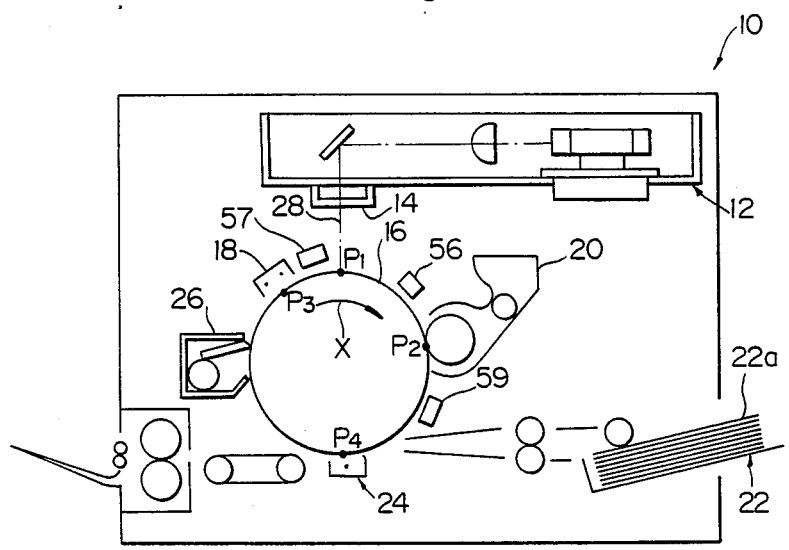
FIG. 3 is a sectional side elevation showing a basic construction of an image forming apparatus of the present invention.

In FIG. 3, a laser printer belonging to a family of image forming apparatuses is shown and generally designated by the reference numeral 10. The laser printer 10 includes a hermetically sealed optics unit 12 which is shown in detail in FIG. 4. A dust-proof glass 14 is provided at a beam outlet of the optics unit 12. The image laser printer 10 further includes a photoconductive element 16 in the form of a drum, a charger 18, a developing unit 20, a paper feeder 22 for feeding paper sheets 22a one at a time, an image tranferring unit 24, and a cleaning unit 26. While the frum 16 is rotated in a direction indicated by an arrow X by driving means (not shown), it is uniformly charged by the charger 18. A laser beam 28 issuing from the optics unit 12 and which forms a beam spot scans the charged surface of the drum 16 to form an electrostatic latent image thereon. The developing unit 20 develops the latent image to produce a toner image, and then the image transfer unit 24 transfers the toner image to the paper sheet 22a. Toner particles remaining on the drum 16 after the image transfer are removed by the cleaning unit 26.

Figure 4:
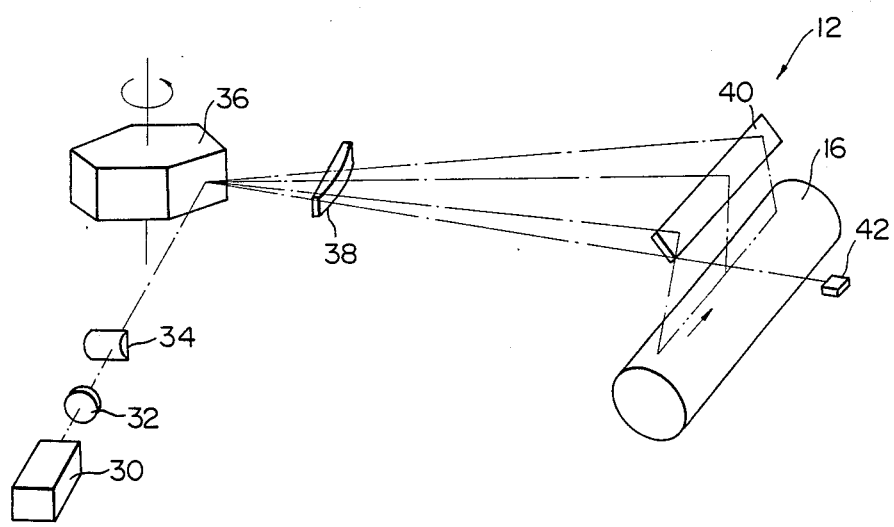
FIG. 4 is a perspective view of laser optics which is installed in the apparatus of FIG. 3.

As shown in FIG. 4, the optics unit 12 is made up of a semiconductor laser 30, a converging lens 32, a cylindrical lens 34, a polygon mirror 36, an f-theta lens 38, a mirror 40, and a photosensor 42 responsive to a laser beam coning out of the polygon mirror 36. A laser beam issuing from the laser 30 is transformed into a parallel beam by the converging lens 32 and then focused by the cylindrical lens 34 onto the polygon mirror 36 in a linear configuration. The beam reflected by the polygon mirror 36 is focused by the f-theta lens 38 onto the drum 16 in the form of a beam spot. As the polygon mirror 36 is rotated, the beam spot scans the surface of the drum 16.

Hereinafter will be described some different methods of detecting the fatigue of a photoconductive element which the present invention practices.

Figure 5:
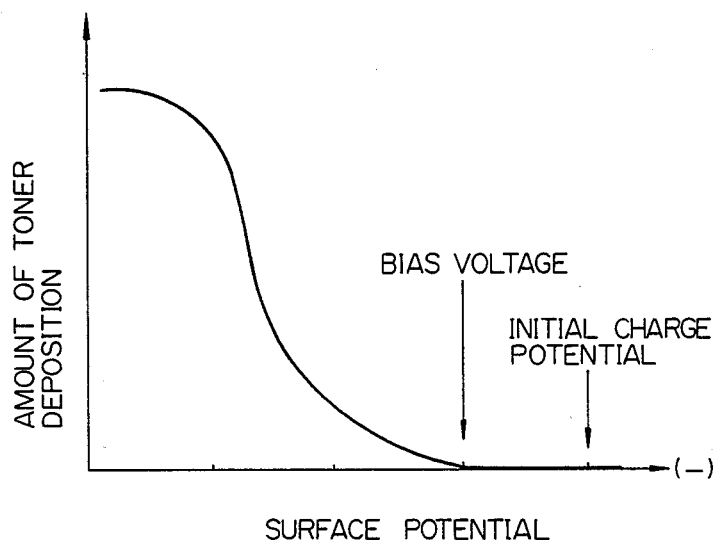
FIG. 5 is a graph representative of a relationship between the surface potential of a photoconductive element and the amount of toner deposition.

As shown in FIG. 3, a first method uses a surface potential sensor 56 which is located close to the drum 16 between an illuminating position $P_1$ and a developing position $P_2$ on the drum 16 so as to detect the surface potential of the drum 16. As also shown in FIG. 3, a second method uses a charge potential sensor 57 which is located in close proximity to the drum 16 between the illuminating position $P_1$, and a charging position $P_3$ on the drum 16 so as to detect a charge potential on the surface of the drum 16. A third method, as also shown in FIG. 3, uses a reflection density sensor 59 which is situated in close proximity to the drum 16 between the developing position $P_2$ and an image transferring position $P_4$ so as to detect a reflection density of a developed toner image. In general, as a photoconductive element is used over a long period of time, the charge potential on the photoconductive element and the surface potential of a latent image formed thereon are sequentially lowered and, further, the amount of toner deposited on the latent image and therefore the amount of reflection from the toner image is lowered. Hence, should a bias potential to be applied to a developing unit be maintained at the same level with not regard to the aging of the photoconductive element, toner particles would begin to deposit in the area of the photoconductive element which is not illuminated (background) as soon as the charge potential decreases beyond a certain value. A relationship between the surface potential of a photoconductive element and the amount of toner deposition on the surface of a photoconductive element is shown in FIG. 5. As shown, as the charge potential on a photoconductive element is lowered to substantially the same level as the bias voltage for development or below due to the aging of the photoconductive element, the amount of toner deposition on the photoconductive element increases. It follows that by detecting the amount of toner deposition, i.e., the reflection density, it is possible to determine the decrease in charge potential which is representative of the fatigue of the photoconductive element.

Figure 6:
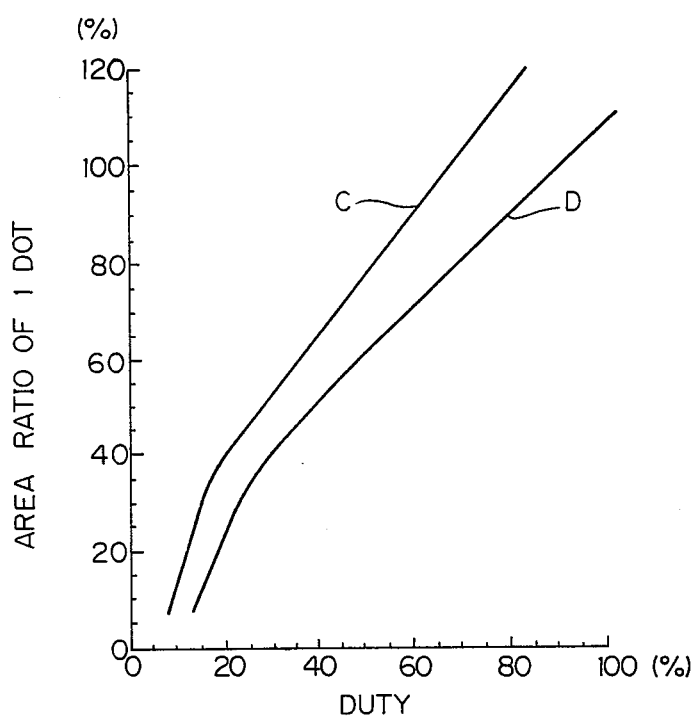
FIG. 6 is a graph showing a relationship between the duty of a laser beam and the area ratio of one dot.

FIG. 6 is a graph showing a relationship between the duty of the laser beam issuing from the laser 30 and the area ratio of one dot. In the figure, curves C and D are respectively representative of a characteristic associated with an initial condition and an characteristic observed when the power of the laser beam is decreased and/or when the sensitivity of a photoconductive element is lowered. The word "duty" refers to a dimensionless turn-on time of the laser beam and is expressed as:

$$duty = \frac{laser\ beam\ turn\text{-}on\ time}{time\ necessary\ for\ scanning\ one\ pixel\ pitch} \times 100\ (\%)$$

The area ratio of one dot is produced by:

$$area\ ratio = \frac{area\ of\ one\ dot\ formed}{area\ of\ one\ pixel} \times 100\ (\%)$$

For example, assuming that the pixel density is 16 per millimeter, the area of one pixel is represented by a square with sides of 0.063 millimeter ($1/16 \approx 0.063$).

It will be seen from the above that the area ratio of a dot is decreased as the power of the laser beam and/or the sensitivity of the photoconductive element is lowered.

A pulse width modulation system for modulating a laser beam and adopted by the present invention is as follows. Briefly, the system is such that when a tone signal is fed from an image processing section of an image forming apparatus, a modulating signal whose pulse width is associated with the particular tone modulates a laser beam which issues from a semiconductor laser.

Figure 7:
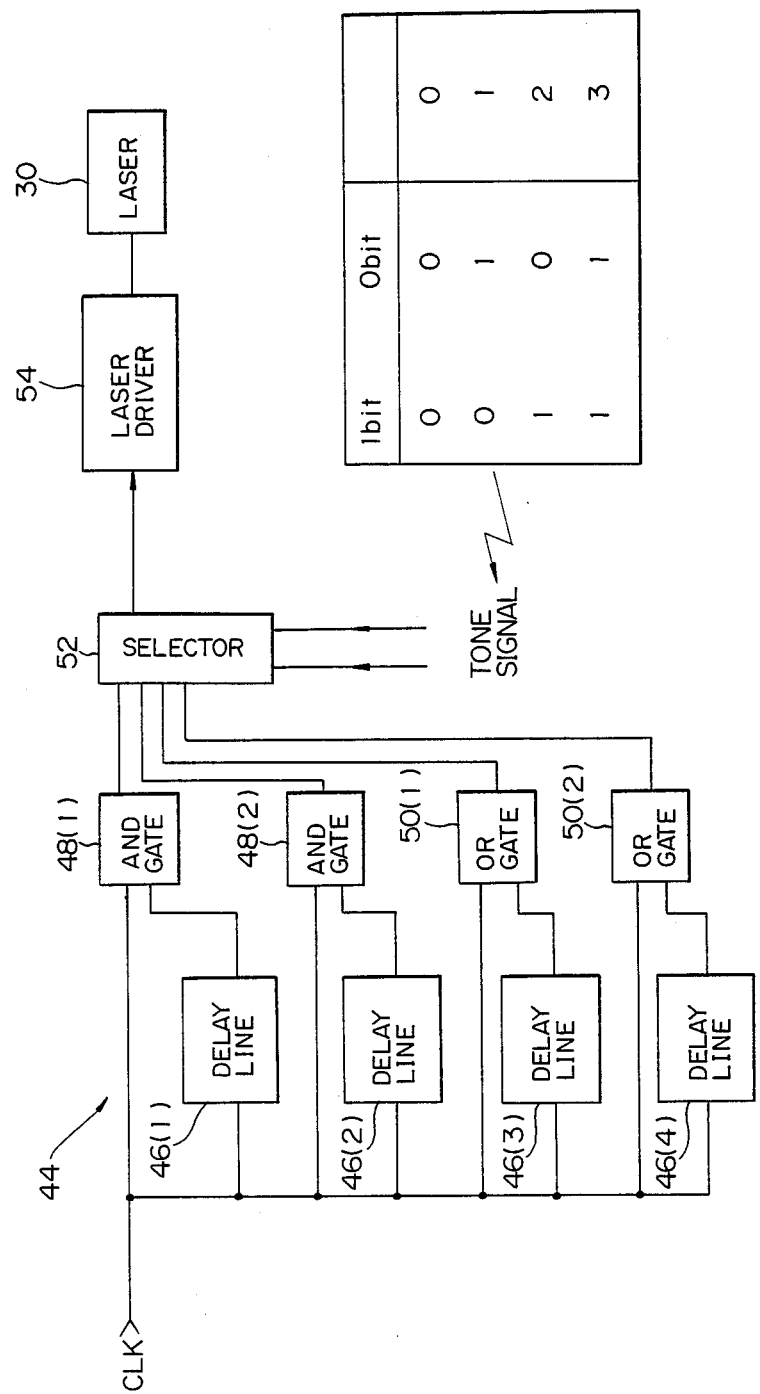
FIG. 7 is a schematic block diagram representative of a pulse width modulation system applicable to the present invention.

FIG. 7 shows a modulation system 44 in which 2-bit parallel signal lines are assigned to a tone signal so that four different tone outputs may be available in total. The system 44 is made up of delay lines 46(1) to 46(4), AND gates 48(1) to 48(2), OR gates 50(1) and 50(2), a selector 52, the semiconductor laser 30, a a laser driver 54. In operation, a pixel clock CLK is applied to the delay lines 46(1) to 46(4) to be delayed thereby by any suitable time, while being applied to the AND gates 48(1) and 48(2) and OR gates 50(1) and 50(2). ANDs from the AND gates 48(1) and 48(2) and ORs from the OR gates 50(1) and 50(2) are fed to the selector 52. In response, the selector 52 delivers to the laser driver 54 an output signal whose pulse width is associated with the tone signal fed from the image processing section. The laser 30 therefore emits a laser beam which hs been modulated by the output signal of the selector 52.

Figure 8A:
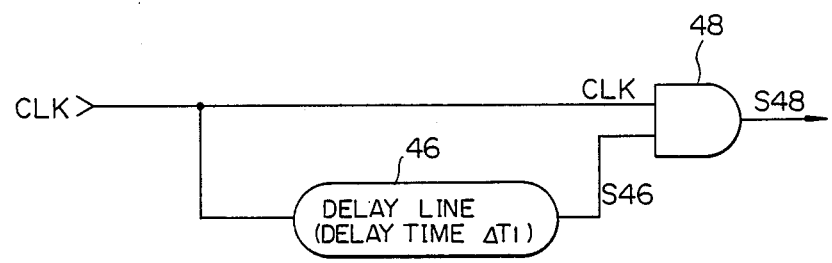
FIGS. 8A, 8B, 9A, 9B are diagrams showing in more detail the construction and operation of the system shown in FIG. 7.
Figure 8B:
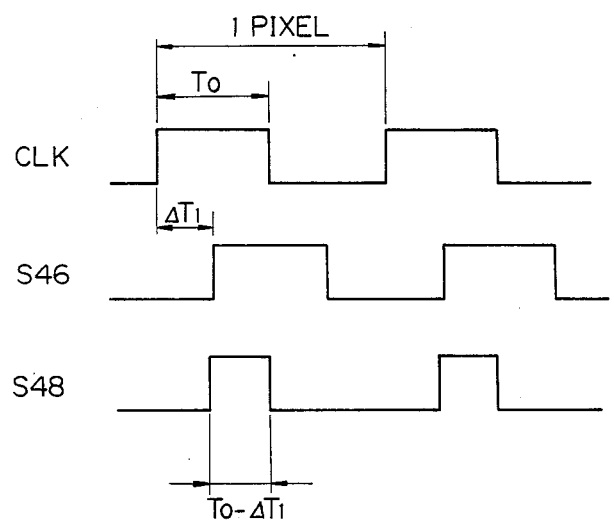
Figure 9A:
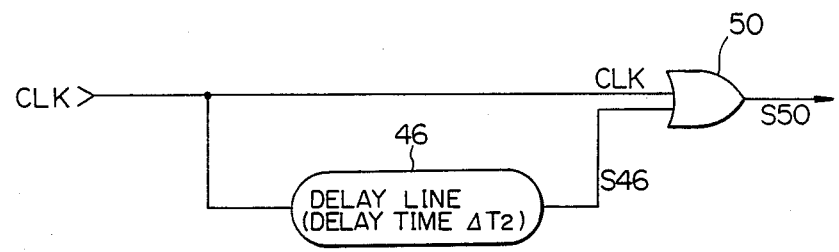
Figure 9B:
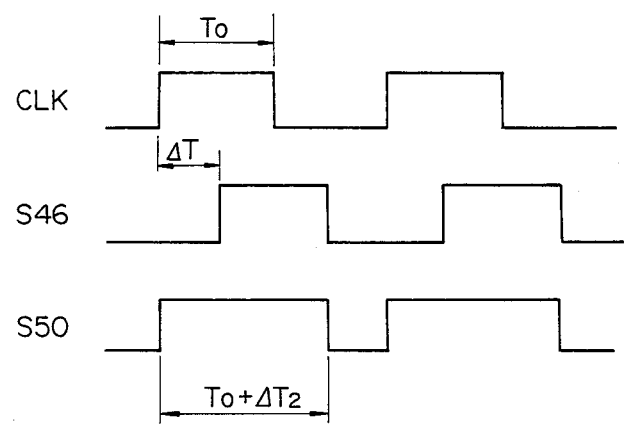

FIGS. 8A and 9A show the circuitry for producing output signals each having any suitable pulse width from the pixel clock CLK by using the delay lines 46(1) to 46(4), AND gates 48(1) and 48(2), and OR gates 50(1) and 50(2). FIGS. 8B and 9B are waveform diagrams associated with FIGS. 8A and 9A, respectively. As shown in FIGS. 8A and 8B, when the pixel clock CLK and a delayed output of any delay line 46 (delay time of $\Delta T_1$) are applied to the associated AND gate 48, a signal S48 having a pulse width of $(t_0 - \Delta T_1)$ is obtained. It is therefore possible to provide the signal S48 with any pulse width $(T_0 - T_1)$ by selecting the delay time $\Delta T_1$ as desired. In FIGS. 9A and 9B, when the pixel clock CLK and the delayed output of the delay line 46 (delay time of $\Delta T_1$) are applied to the OR gate 50, a signal S50 having a pulse width of $(T_0 - \Delta T_2)$ is obtained. Again, the signal S50 can be provided with any pulse width $(T_0 - \Delta T_2)$ by selecting the delay time $\Delta T_2$ as desired.

The circuits shown in FIGS. 8A and 9A are arranged in a number which is the same as the number of tones which may be commanded by the image processing section, the outputs of the circuits being fed to the selector 52.

While the specific circuitry shown in FIG. 7 accommodates four different tones, a greater number of tones may be implemented by increasing the number of such circuits as well as the number of bits of the tone signal. For example, eight consecutive tones are available if use is made of circuits which produce eight different pulse widths and a 3-bit tone signal.

Preferred embodiments of the image forming apparatus in accordance with the present invention will be described hereinafter.

First Embodiment

Figure 10:
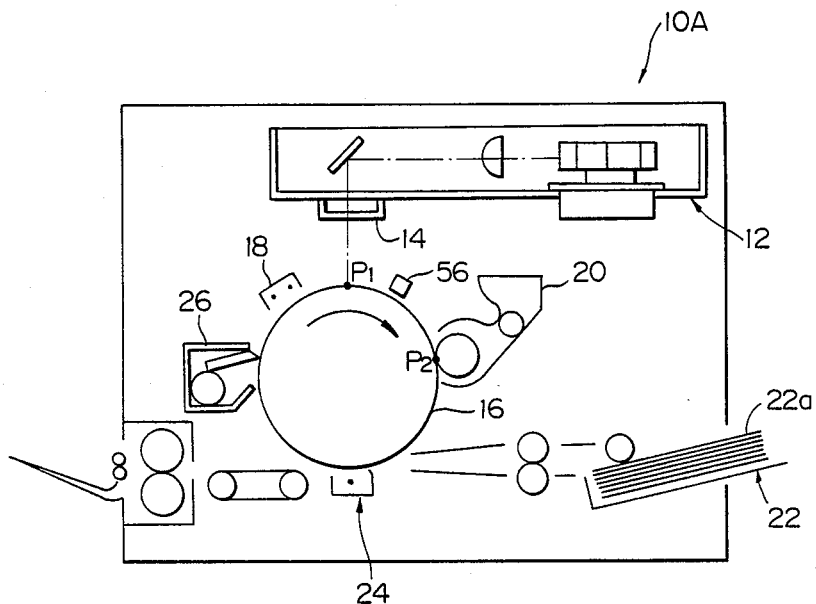
FIG. 10 is a section showing a first embodiment of the image forming apparatus in accordance with the present invention.

Referring to FIG. 10, a laser printer representative of a first embodiment of the image forming apparatus in accordance with the present invention is shown. In the figure, similar components and structural elements to those shown in FIG. 3 are designated by the same reference numerals. The laser printer, generally 10A, has the surface potential sensor 56 for detecting the surface potential of the drum 16, i.e., a voltage associated with the surface potential of the drum 16.

Figure 11:
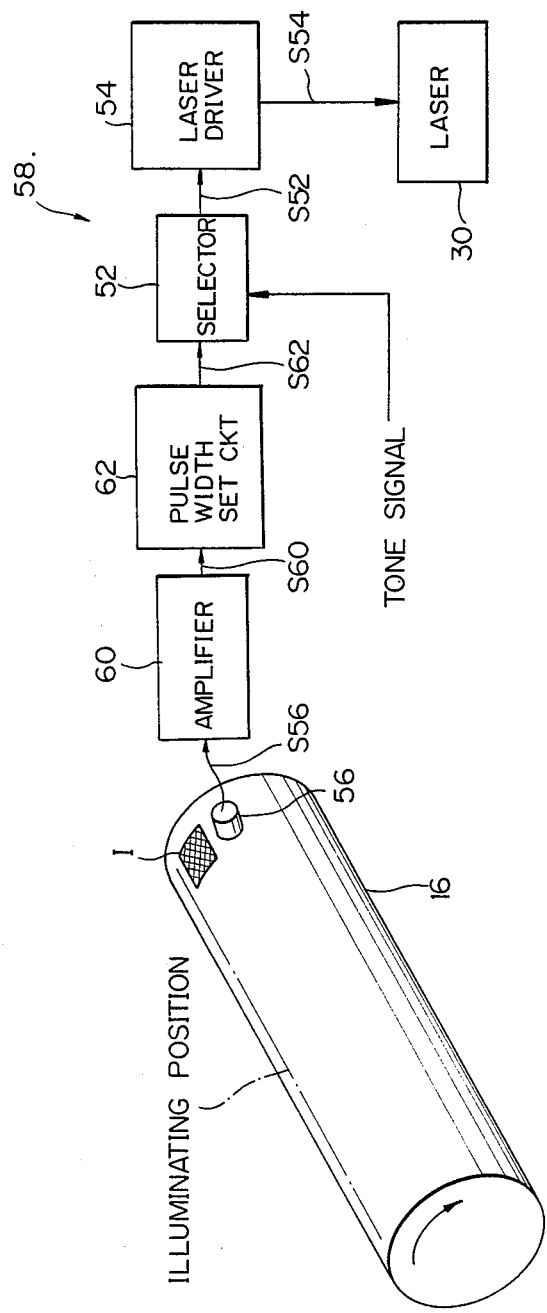
FIG. 11 is a schematic block diagram showing the construction of a laser beam control system associated wt the first embodiment.

FIG. 11 shows a laser beam control system associated with the illustrative embodiment. As shown, the control system 58 is made up of an amplifier 60, a pulse width setting circuit 62, the selector 52, and the laser driver 54. The control system 58 turns on the laser 30 by a certain duty to form an electrostatic latent image I in a non-effective image area of the drum 16 where no image will be transferred to the paper sheet 22a, e.g., an effective image area in the main scanning direction or an area intervening between two imaging areas which are individually allocated to images to be transferred to two successive paper sheets. The surface potential sensor 56 generates an output signal S56 representative of the surface potential of the latent image I. The signal S56 is amplified by the amplifier 60, and the amplified signal S60 is fed to the pulse width setting circuit 62. In response, the pulse width setting circuit 62 changes the set pulse widths in matching relation to the signal S60, i.e., the output S56 of the sensor 56 and feeds a signal S62 representative o the changed pulse widths to the selector 52. Then, the selector 52 delivers to the laser driver 54 a signal S52 whose pulse width is associated with a tone signal, so that the laser driver 54 drives the laser 30 with its output signal S54.

Figure 12:
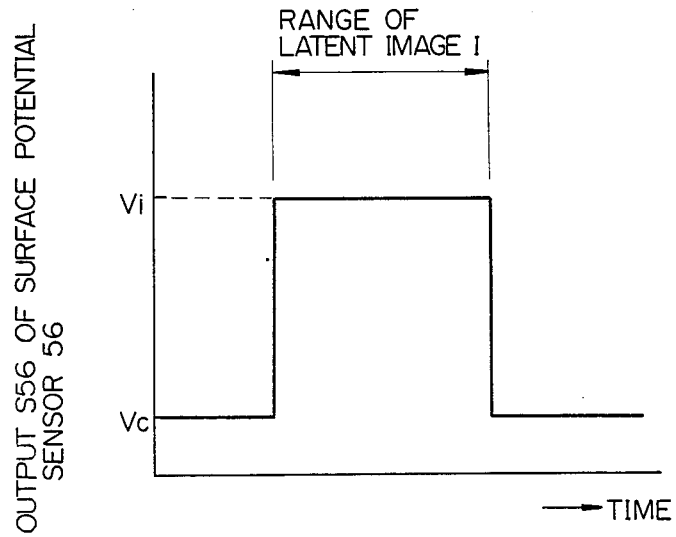
FIG. 12 shows the waveform of an output signal of a surface potential sensor which is shown in FIG. 12.

FIG. 12 shows the waveform of the output signal S56 of the surface potential sensor 56. In the figure, labeled Vc and Vi respectively the charge potential (e.g. −800 volts) of the drum 16 and the surface potential of the latent image I (e.g. −100 volts).

Figure 13:
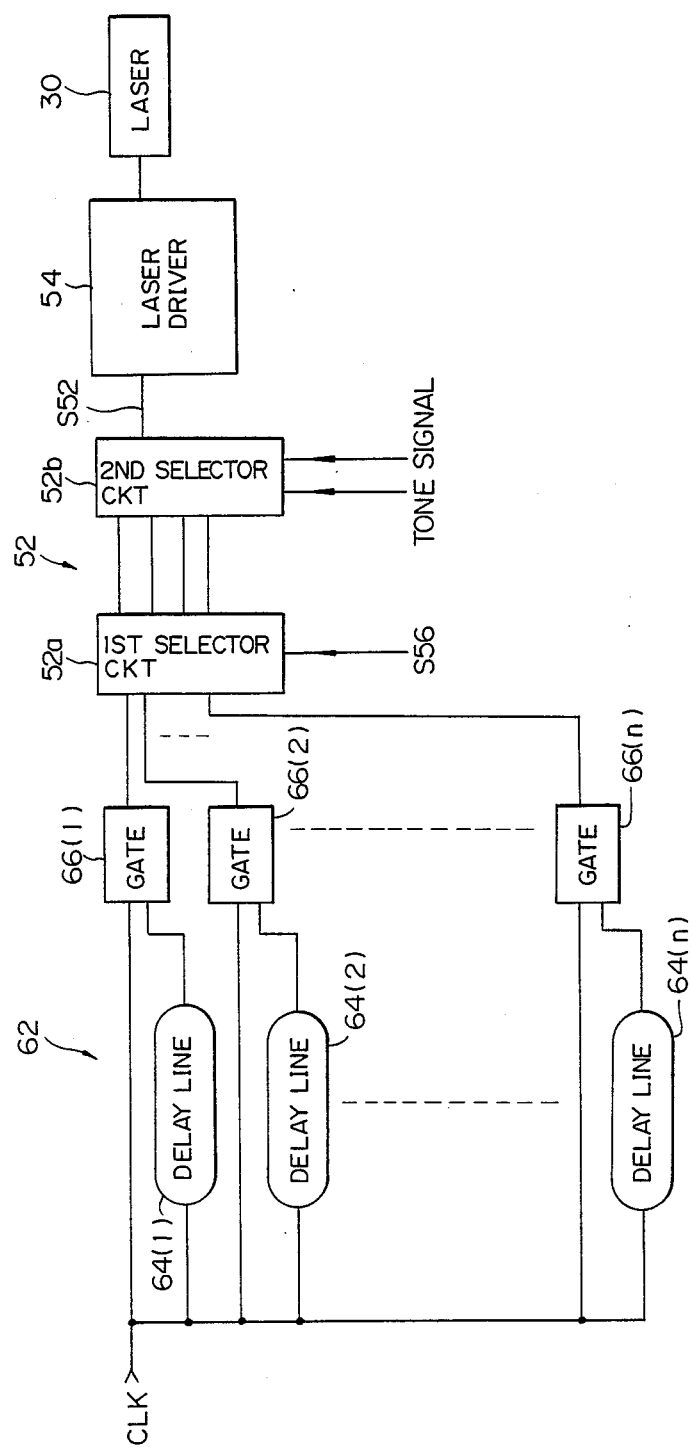
FIG. 13 is a schematic block diagram showing in detail a pulse width setting circuit and a selector shown in FIG. 11.

Referring to FIG. 13, a specific construction of the pulse width setting circuit 62 and selector 22 of FIG. 11 is shown. In the figure, the pulse width setting circuit 62 comprises delay lines 64(1) to 64(n) and AND or OR gates 66(1) to 66(n). The selector 52 is composed of a first selector circuit 52a and a second selector circuit 52b. Applied to the first selector circuit 52a are signals each having any suitable pulse width as produced by the delay lines 64(1) to 64(n) and gates 66(1) to 66(n), and the output signal S56 of the surface potential sensor 56 shown in FIGS. 10 and 11 (in FIG. 11, the output signal S60 of the amplifier 60). The first selector circuit 52a selects signals whose pulse widths match with the output signal S56 of the surface potential sensor 56, delivering those signals to the second selector circuit 52b. In response, the second selector circuit 52b produces a signal S52 having a particular pulse width which is associated with a tone signal, as stated earlier. The signal S52 is fed to the laser driver 54 to drive the laser 30.

The operation of the image forming apparatus 10A is as follows. Assume that a 1-bit (two-level) signal is produced in association with the intensity of a laser beam, i.e., a high (H) signal and low (L) signal are produced when the output signal of the surface potential sensor 56 representative of the surface potential Vi of the latent image I shown in FIG. 12 is higher than a certain reference value and when it is lower than the reference value, respectively, Also, assume that only four different signals each haviang a different pulse width (representative of a particular tone) are selected out of multiple pulse width signals.

Figure 14:
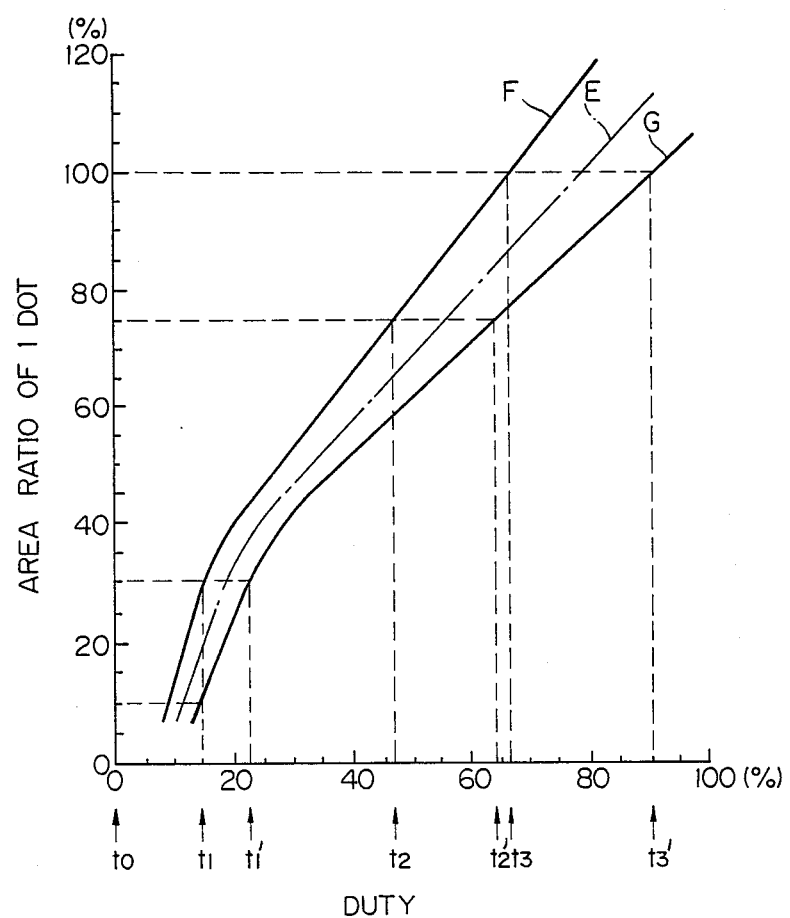
FIG. 14 is a graph showing how laser beam power is set.
Figure 15:
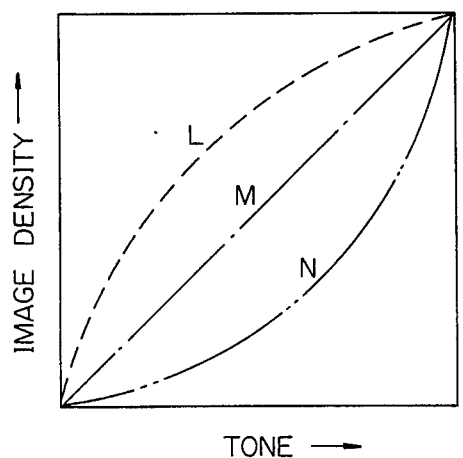
FIG. 15 is a plot demonstrating a relationship between the tone and the image density.

FIG. 14 is a graph similar to FIG. 6, showing how the power of a laser beam is set in the illustrative embodiment. In the figure, a curve E shows a relationship between the duty and the area ratio of one dot which is associated with the above-mentioned reference value. A curve F shows a predetermined relationship between the duty and the area ratio of one dot which holds when the output S56 of the surface potential detector 56 is higher than the reference value. Further, a curve G shows a predetermined relationship between the duty and the area ratio of one dot which holds when the output S56 is lower than the reference value. When the sensor output S56 is higher than the reference value, beam turn-on times $t_0$ (=0), $t_1$, $T_2$ and $T_3$ individually associated with four different tones are used by referencing the predetermined relationship F between the duty and the area ratio. When the sensor output S56 is lower than the reference value, beam turn-on times $T_0$ (=0), $t'_1$, $T'_2$ and $t'_3$ individually associated with four different tones are used by referencing the relationship G between the duty and the area ratio. While area ratios of one dot which are 0 (%), −10 (%), 3 (%), 75 (%) and 100 (%) are used in association with four tones in FIG. 13, the area ratios should be selected in matching relation to desired tone characteristics (curves L, M and N shown in FIG. 15).

A reference will be made to FIG. 16 for describing how the first selector 52a selects signals having four particular pulse widths out of multiple pulse width signals in response to the output signal S56 of the surface potential sensor 56.

Figure 16:
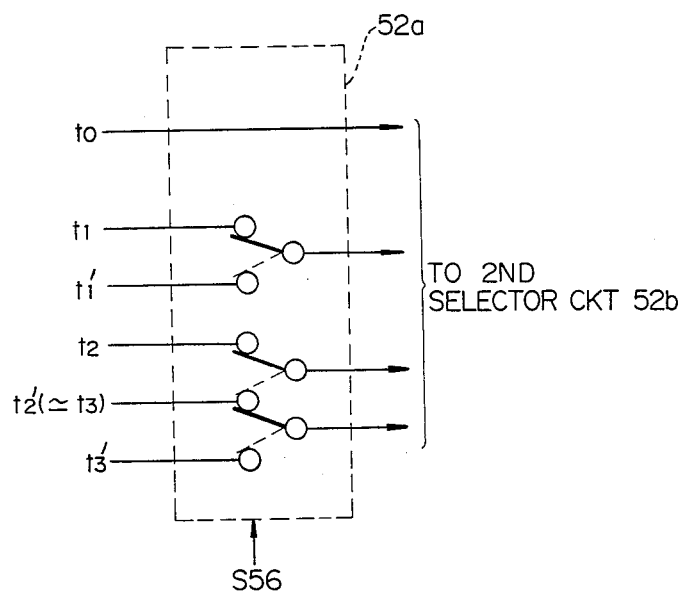
FIG. 16 is a schematic diagram showing the operation of a selector of FIG. 13 which produces four signals each having a different pulse width in response to an output signal of the surface potential sensor.

In FIG. 16, six circuits for individually setting pulse widths of $t_0$, $t_1$, $t'_1$, $t_2$, $t'_2$ and $t'_3$ are prepared on the assumption that $t'_2$ is nearly equal to $t_3$ (see FIG. 14). When the surface potential signal S56 fed to the first selector circuit 52a has a high level, the signals having pulse widths of $t_0$, $t_1$, $t_2$ and $t'_2$ (nearly equal to $t_3$) are selected (as indicated by solid lines in FIG. 16) and fed to the second selector circuit 52b. When the signal S56 has a low level, signals whose pulse widths are $t_0$, $t'_1$, $t'_2$ and $t'_3$ are selected (as indicated by phantom lines in FIG. 16) and applied to the second selector 52b.

The foregoing description has concentrated on a specific case wherein pulse width signals representative of four different tones are obtained from a two-level beam output signal. If desired, a greater number of pulse width setting circuits 62 and a sensor output S56 having a greater number of bits may be used to minimize the variation of the area ratio of one dot (i.e. tone characteristic) against the fluctuation of the laser beam output and that of the sensitivity of the photoconductive element.

Second Embodiment

A second embodiment of the image forming apparatus in accordance with the present invention is essentially similar in construction to the laser printer 10A of FIG. 10 except for a laser beam control system. In the description of the second embodiment to follow, the components and structural elements similar to those of the first embodiment are designated by the same reference numerals.

Figure 17:
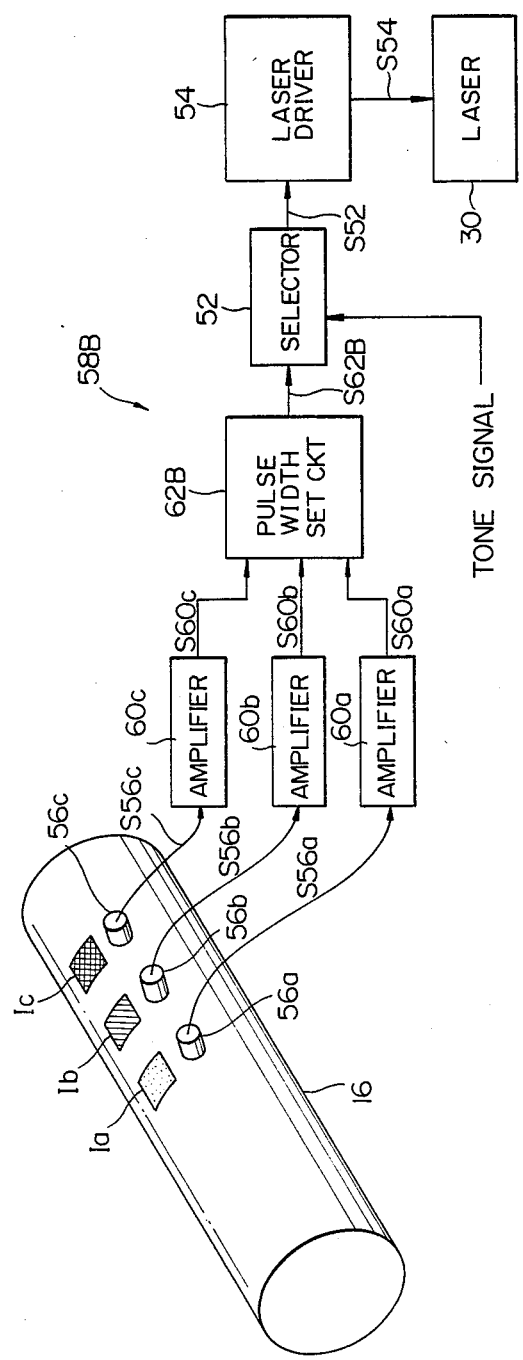
FIG. 17 is a schematic block diagram showing a second embodiment of the present invention.

Referring to FIG. 17, a laser beam control system associated with this embodiment is shown. The control system, generally 58B, includes surface potential sensors 56a, 56b and 56c responsive respectively to the surface potentials in those portions of the drum 16 where latent images Ia, Ib and Ic are formed, and amplifiers 60a, 60b and 60c connected respectively to the sensors 56a, 56b and 56c. The outputs S60a, S60b and S60c of the amplifiers 60a, 60b and 60c, respectively, are commonly fed to a pulse width setting circuit 62B. The output signal of the pulse width setting circuit 62B is processed in the same manner as in FIG. 11, and the detailed description of such processing will be omitted. Specifically, the latent images Ia,Ib and Ic are formed in a non-effective image area of the drum 16 and are associated respectively with the beam turn-on times of $t_1$, $t_2$ and $t_3$ shown in FIG. 14. The output signals S56a to S56c of the amplifiers 60a to 60c individually representative of the surface potentials of the latent images Ia to Ic are amplified by their associated amplifiers 60a to 60c.

FIG. 18 shows a specific construction of the pulse width setting circuit 62B. As shown, the circuit 62B comprises delay lines 68(0) to 68(3), delay time changing circuits 70a, 70b and 70c and gates 72(0) to 72(3). In the figure, a signal S72(0) is a signal having a zero pulse width ($t_0$ in FIG. 16) and produced by the delay line 68(0) and gate 72(0) (AND gate). Signals S72(1), S72(2) and S72(3) are signals having pulse widths of $t_1$, $t_2$ and $t_3$, respectively, which are individually produced by the delay lines 68(1), 68(2) and 68(3) and gates 72(1), 72(2) and 72(3) (AND or OR gates). The delay times $\Delta t_1$, $\Delta T_2$ and $\Delta t_3$ of the delay lines 68(1), 68(2) and 68(3), respectively, and therefore the pulse widths of the signals S72(1), S72(2) and S72(3) are variable by the function of their associated delay time changing circuits 70a, 70b and 70c. The amplified sensor outputs S60a, S60b and S60 are applied to the delay time changing circuits 70a, 70b and 70c, respectively. The delay times $\Delta T_1$, $\Delta t_2$ and $\Delta t_3$ are individually controlled such that the surface potentials of their associated latent images Ia, Ib and Ic constantly lie in a predetermined allowable range. This guarantees an image having stable tones despite the possible vairation of the power of the beam incident to the drum 16 and that of the sensitivity of the drum 16.

Figure 19A:
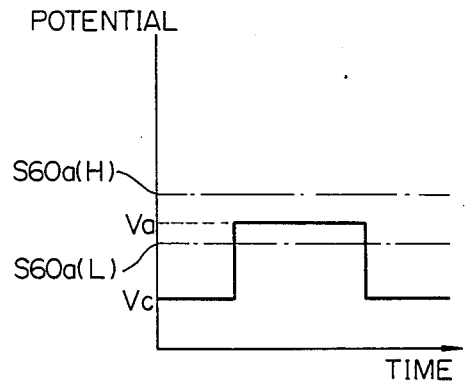
FIGS. 19A to 19C are diagrams demonstrating the operation of the circuitry shown in FIG. 18.
Figure 19B:
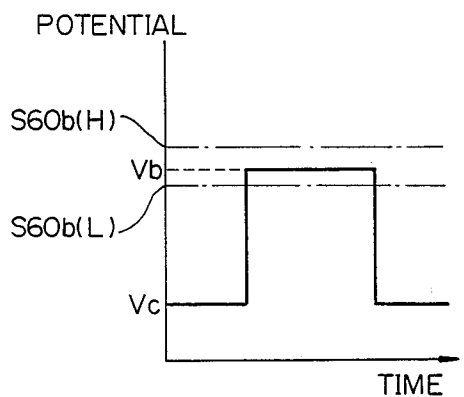
Figure 19C:
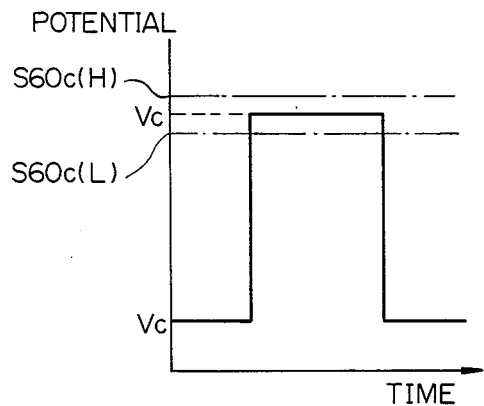

FIGS. 19A to 19C are waveform diagrams similar to FIG. 12, demonstrating the operation of the pulse width setting circuit 62B. Specifically, the waveforms shown in FIGS. 19A to 19C are individually associated with the output signals S50a, S50b and S50c of the surface potential sensors 50a, 50b and 50c which are assigned to the latent images Ia, Ib and Ic, respectively. As shown, the delay times $\Delta t_1$, $\Delta t_2$ and $\Delta t_3$ are changed by their associated delay time changing circuits 70a, 70b and 70c such that the pulse width increases when the surface potential is lowered beyond a certain value and decreases when the latter is raised beyond the same. For example, when the sensor output S60a (FIG. 17) associated with the latent image Ia (FIG. 19A) is higher than an upper limit S60a (H), the delay time changing circuit 70a controls the delay line 68(1) to reduce the pulse width of the signal S72(1) shown in FIG. 18. Conversely, when the sensor output S60a is lower than a lower limit S60a (L), the delay time changing circuit increases the pulse width of the signal S72(1) via the dealy line 68(1).

Third Embodiment

Figure 20:
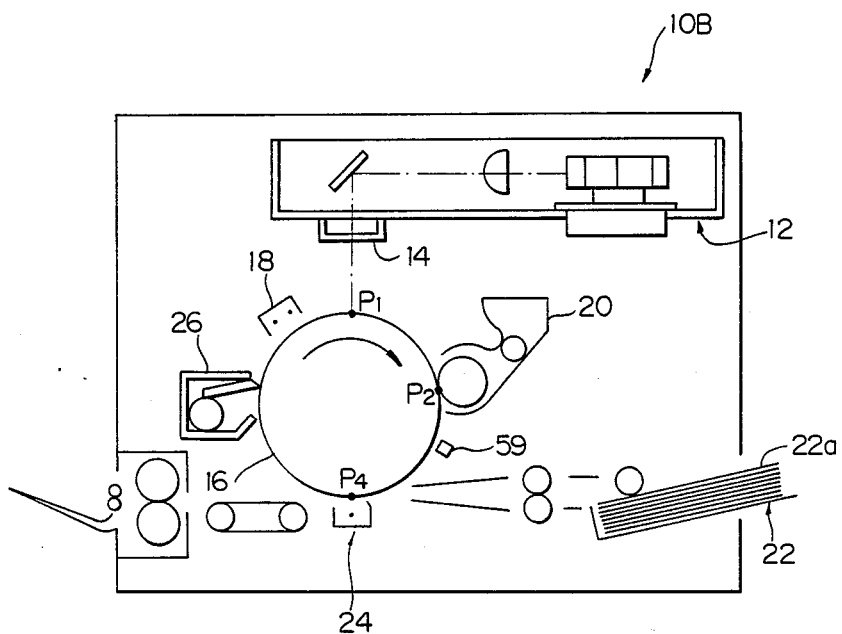
FIG. 20 is a section showing a third embodiment of the present invention.

Referring to FIG. 20, the laser printer 10B of a third embodiment has the reflection density sensor 59 responsive to the reflection density of a toner image which is produced by developing a latent image on the drum 16. The sensor 59 is implemented as a reflection type photosensor which is made up of a light emitting element and a light-sensitive element. While light issuing from the light emitting element illuminates a toner image (FIG. 21), a reflection from the toner image T varies in amount depending upon the density of the toner image T. For example, when the amount of toner deposited on the toner image T is great (i.e. the density is high), the quantity of light incident to the light receiving element of the sensor 59 is small because a substantial part of the light is scattered. Hence, the output S59 of the sensor 59 is associated with the reflection density of the toner image T.

Figure 21:
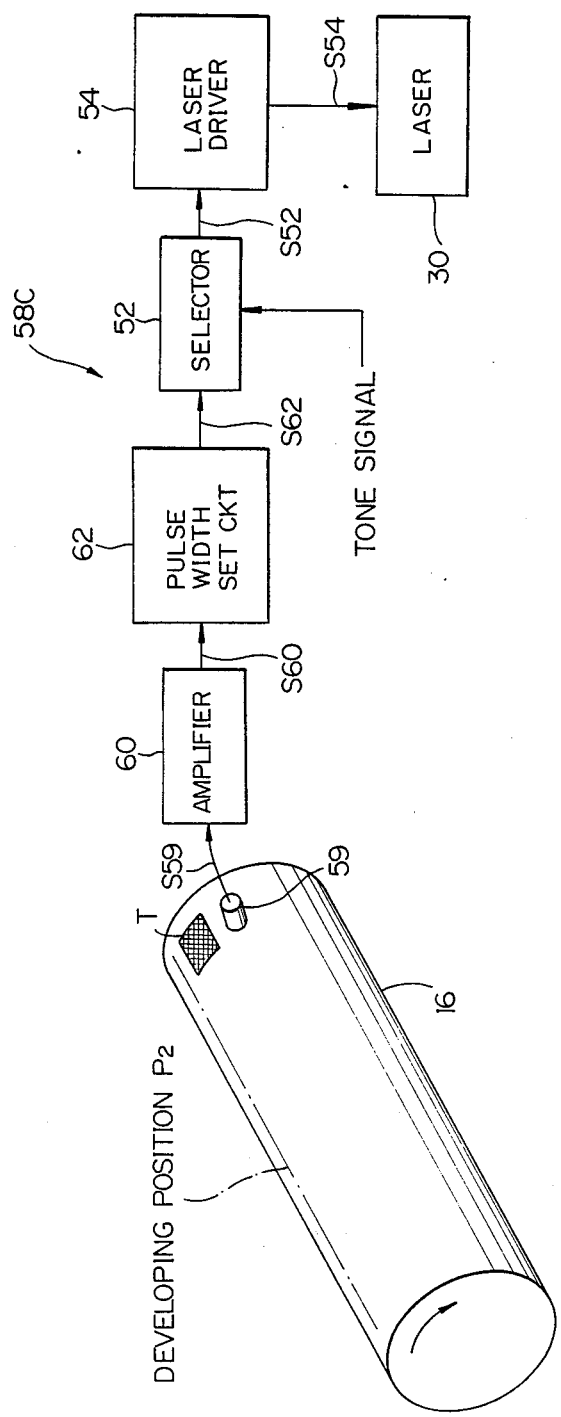
FIG. 21 is a schematic block diagram showing a laser beam control system associated with the third embodiment.
Figure 22:
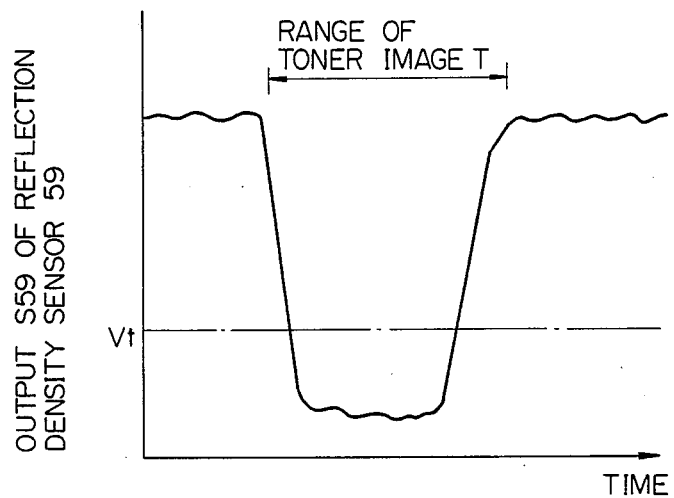
FIG. 22 shows the waveform of an output signal of a reflection density sensor.

In detail, FIG. 21 shows a laser beam control system 58C associated with this embodiment which includes the reflection density sensor 59. The control system 58C turns on a laser beam in a predetermined pattern and by a predetermined duty to form an electrostatic latent image in a non-effective image area on the drum 16, the latent image being developed to become the toner image T. A reflection from the toner image T is sensed by the reflection density sensor 59, then amplified by the amplifier 60, and then applied to the pulse width setting circuit 62. FIG. 22 shows the waveform of the output signal S59 of the reflection density sensor 59. The operation of the pulse width setting circuit 62 and the subsequent various kinds of processing are the same as in FIG. 13.

Figure 23:
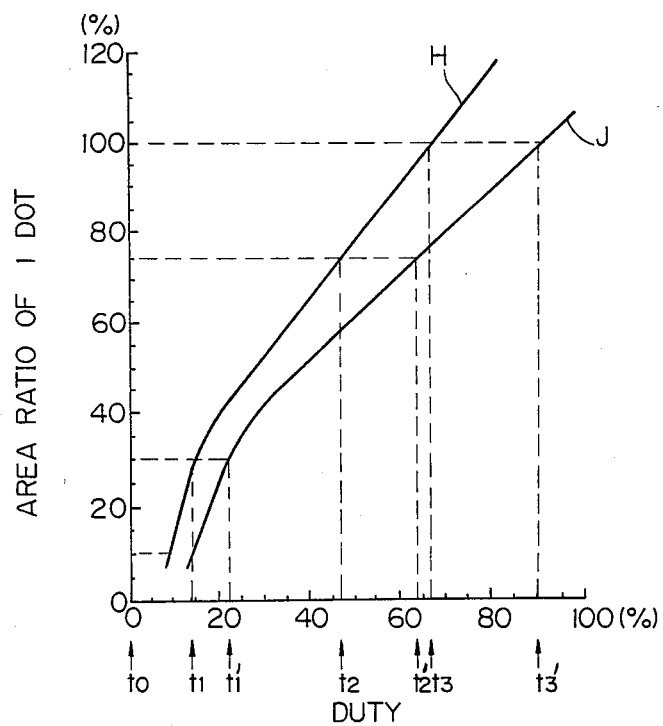
FIG. 23 is a graph showing how laser beam power is set.

FIG. 23 is a graph showing how the power of a laser beam is set by the control system 58C of FIG. 21. In the figure, curves H and J show respectively predetermined relationships between the duty and the area ratio of one dot which are associated with the outputs S59 of the reflection density sensor 59 higher than a reference value Vt and the outputs S59 lower than the same. In the illustrative embodiment, when the 1-bit output signal S59 of the sensor 59 (two-level) which is associated with the output intensity of the laser beam is higher than a reference value Vt, a high level (H) signal is produced; when it is lower than the reference value Vt, a low level (L) signal is produced. In response to any of such outputs S59 of the sensor 59, four different signals each having a different pulse width (i.e. tone) are produced out of multiple pulse width signals.

Specifically, when the sensor output S59 is higher than the reference value Vt, beam turn-on times $t_0 (=0)$, $t_1$, $t_2$ and $t_3$ individually associated with four different tones are used by referencing the predetermined relationship between the duty and the area ratio. When the sensor output S59 is lower than the reference value Vt, beam turn-on times $t_0 (=0)$, $t'_1$, $t'_2$ and $t'_3$ individually associated with four different tones are used by referencing the relationship between the duty and the area ratio. While area ratios of one dot which are 0 (%), 10 (%), 3 (%), 75 (%) and 100 (%) are used in association with four tones in FIG. 23, the area ratios should be selected in matching relation to desired tone characteristics (curves L, M and N shown in FIG. 15).

The selector 52 is constructed in the same manner as in FIG. 16 for obtaining a group of four pulse width signals out of multiple pulse width signals in response to the output S59 of the reflection density sensor 59. Specifically, as shown in FIG. 16, six circuits for individually setting pulse widths of $t_0$, $t_1$, $t'_1$, $t_2$, $t'_2$ and $t'_3$ are prepared on the assumption that $t'_2$ is nearly equal to $t_3$ (see FIG. 23). When the reflection density signal S59 fed to the first selector circuit 52a has a high level (H), the signals having pulse widths of $t_0$, $t_1$, $t_2$ and $t'_2$ (nearly equal to $t_3$) are selected (as indicated by solid lines in FIG. 16) and fed to the second selector circuit 52b. When the signal S59 has a low level (L), signals whose pulse widths are $t_0$, $t'_1$, $t'_2$ and $t'_3$ are selected (as indicated by phantom lines in FIG. 16) and applied to the second selector circuit 52b.

The foregoing description has concentrated on a specific case wherein pulse width signals representative of four different tones are obtained from a two-level beam output signal. If desired, a greater number of pulse width setting circuits 62 and a sensor output S56 having a greater number of bits may be used to minimize the variation of the area ratio of one dot (i.e. tone characteristic) against the fluctuation of the laser beam output and that of the sensitivity of the photoconductive element.

Fourth Embodiment

A laser printer representative of a fourth embodiment of the present invention has the reflection density sensor 59 of FIG. 20, as in the third embodiment.

Figure 24:
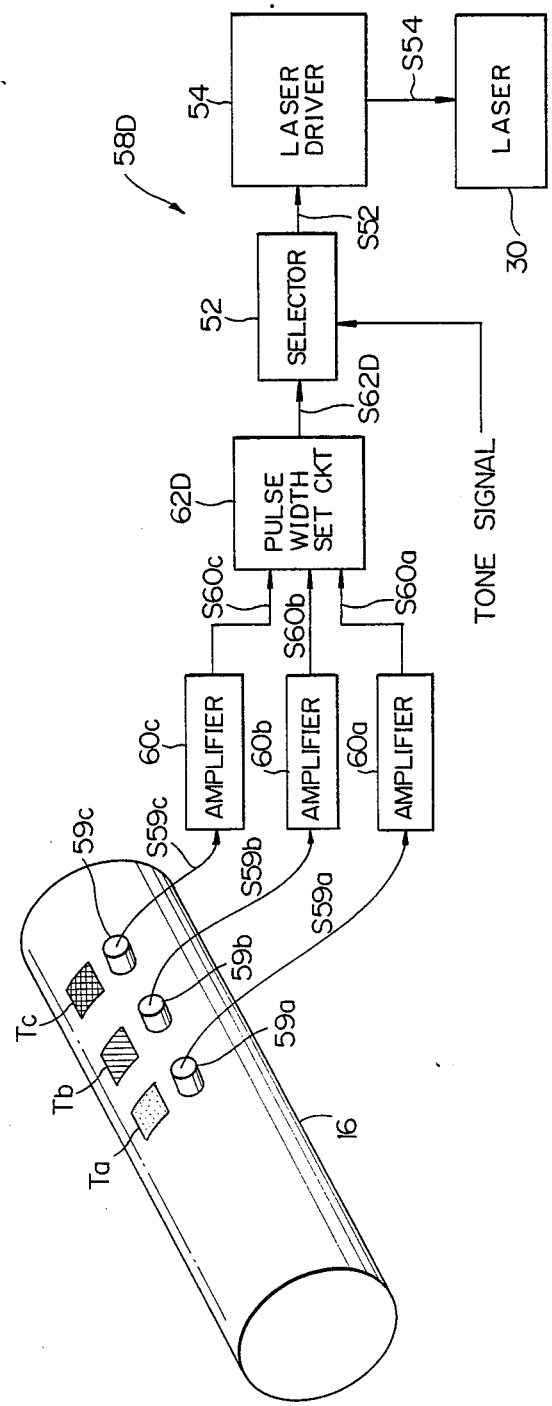
FIG. 24 is a schematic block diagram showing a laser beam control system representative of a fourth embodiment of the present invention.

Referring to FIG. 24, a laser beam control system associated with this embodiment is shown. The control system, generally 58D, deals with toner images Ta, Tb and Tc in place of the latent images Ia, Ib and Ic shown in FIG. 17. In FIG. 24, three different latent images are formed in a non-effective image area of the drum 16 by beam turn-on times of $t_1$, $t_2$ and $t_3$, respectively, and then developed to become toner images Ta, Tb and Tc. Reflection density sensors 59a, 59b and 59c sense the reflection densities of the toner images Ta, Tb and Tc, respectively, and amplifiers 60a, 60b and 60c amplify respectively the outputs S59a, S59b and S59c of the sensors 59a, 59b and 59c. The outputs S60a, S60b and S60c of the amplifiers 60a, 60b and 60c, respectively, are applied to a pulse width setting circuit 62D. This circuit 62D is similar in construction to the circuit 62B shown in FIG. 18. As shown in FIG. 18, a signal S72 (0) is a signal having a zero pulse width ($t_0$ in FIG. 16) and produced by the delay line 68 (0) and AND gate 72 (0). Signals S72 (1), S72 (2) and S72 (3) are signals having pulse widths of $t_1$, $t_2$ and $t_3$, respectively, which are individually produced by the delay lines 68 (1), 68 (2) and 68 (3) and AND or OR gates 72 (1), 72 (2) and 72 (3). The delay times $\Delta t_1$, $\Delta t_2$ and $\Delta t_3$ of the delay lines 68 (1), 68 (2) and 68 (3), respectively, and therefore the pulse widths of the signals S72 (1), S72 (2) and S72 (3) are variable by the function of their associated delay time changing circuits 70a, 70b 70c. The amplified outputs S60a, S60b and S60 associated with the sensor outputs S59a, S59b and S59c, respectively, are applied to the delay time changing circuits 70a, 70b and 70c, respectively. The delay times $\Delta t_1$, $\Delta t_2$ and $\Delta t_3$ are individually controlled such that the reflection densities of their associated toner images Ta, Tb and Tc constantly lie in a predetermined allowable range. This guarantees an image having stable tones despite the possible variation of the power of the beam incident to the drum 16 and that of the sensitivity of the drum 16.

In FIG. 18, the delay time changing circuits 70a to 70c change their associated delay times $\Delta t_1$ to $\Delta t_3$ such that the pulse width decreases when the reflection density is lowered beyond a certain value and increases when the latter is raised beyond the same.

Fifth Embodiment

While the embodiments described above use a multi-level pulse width modulation system, the present invention may alternatively be practiced with a two-level pulse width modulation system, as described hereinafter.

Figure 25:
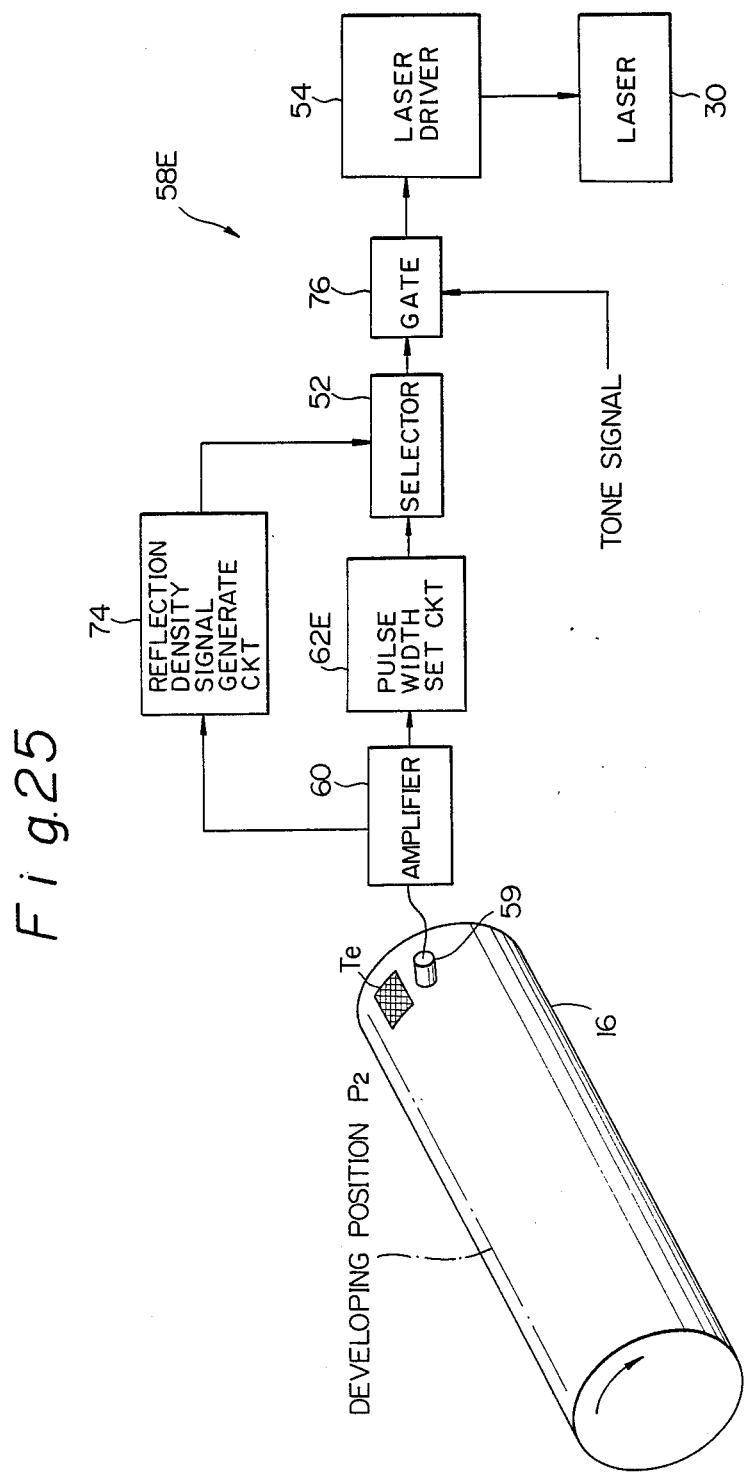
FIG. 25 is a schematic block diagram showing a laser beam control system respresentative of a fifth embodiment of the present invention.
Figure 26:
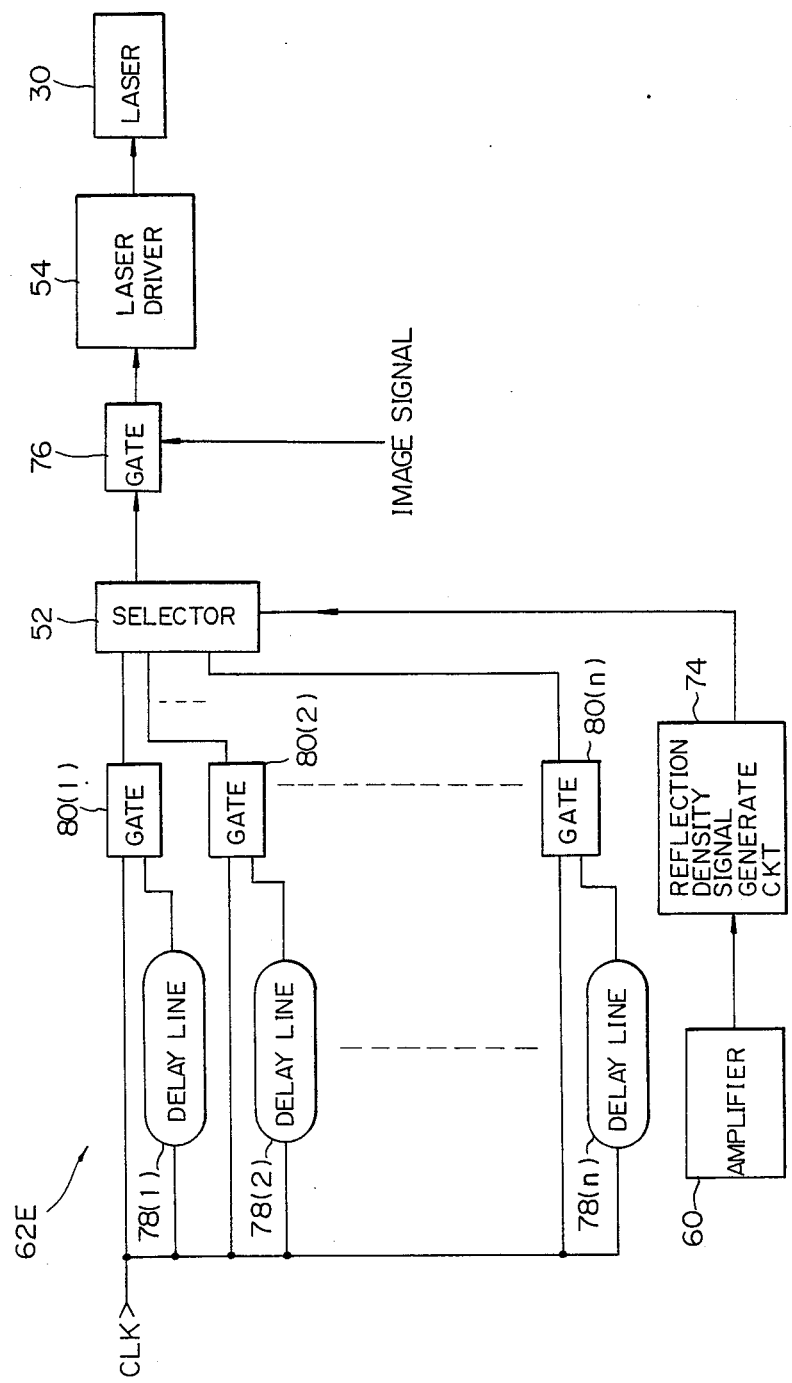
FIG. 26 is a schematic block diagram showing the system of FIG. 25 in detail.
Figure 27:
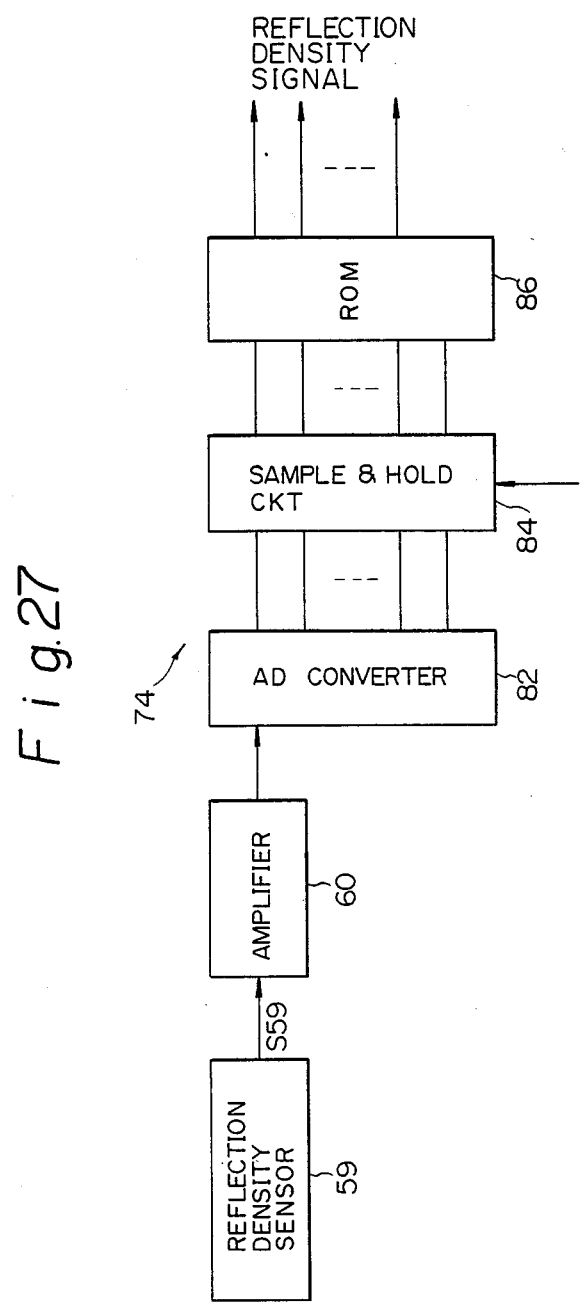
FIG. 27 is a schematic block diagram of a reflection density signal generating circuit which allows the control system of FIGS. 25 and 26 to produce a reflection density signal.

FIG. 25 shows a laser beam control system 68E representative of a fifth embodiment of the present invention which uses the reflection density sensor 59 of FIG. 20. As shown, the control system 68E additionally includes a reflection density generating circuit 74, and a gate 76 to which an image signal is applied. The control system 68E has a pulse width setting circuit 62E which, as shown in FIG. 26, comprises delay lines 78 (1) to 78 (n) and AND or OR gates 80 (1) to 80 (n). A specific construction of the reflection density signal generating circuit 74 is shown in FIG. 27. As shown, the circuit 74 is made up of an analog-to-digital (AD) converter 82, a sample and hold circuit 84, and a read only memory (ROM) 86. A reflection density signal generated by such a circuit 74 offers greater freedom of pulse width selection. Specifically, as shown in FIG. 27, the output signal S59 of the reflection density sensor 59 is amplified by the amplifier 60 and then transformed into digital data by the AD converter 82. While at least one leaf or one page of image is being written, the digital data from the AD converter 82 is held by the sample and hold circuit 84 which is adapted to hold preceding data. The output of the sample and hold circuit 84 is fed to the ROM 86 in the form of address data so that a reflection density signal associated with that particular data is fed from the ROM 86. It is to be noted that a reset signal to be fed to the sample and hold circuit 84 may be generated at any suitable timing depending upon the required correction accuracy.

Sixth Embodiment

While the embodiments described so far are implemented as a one-dot multi-level output laser printer, the present invention is similarly applicable to a one-dot two-level output laser printer.

Figure 28:
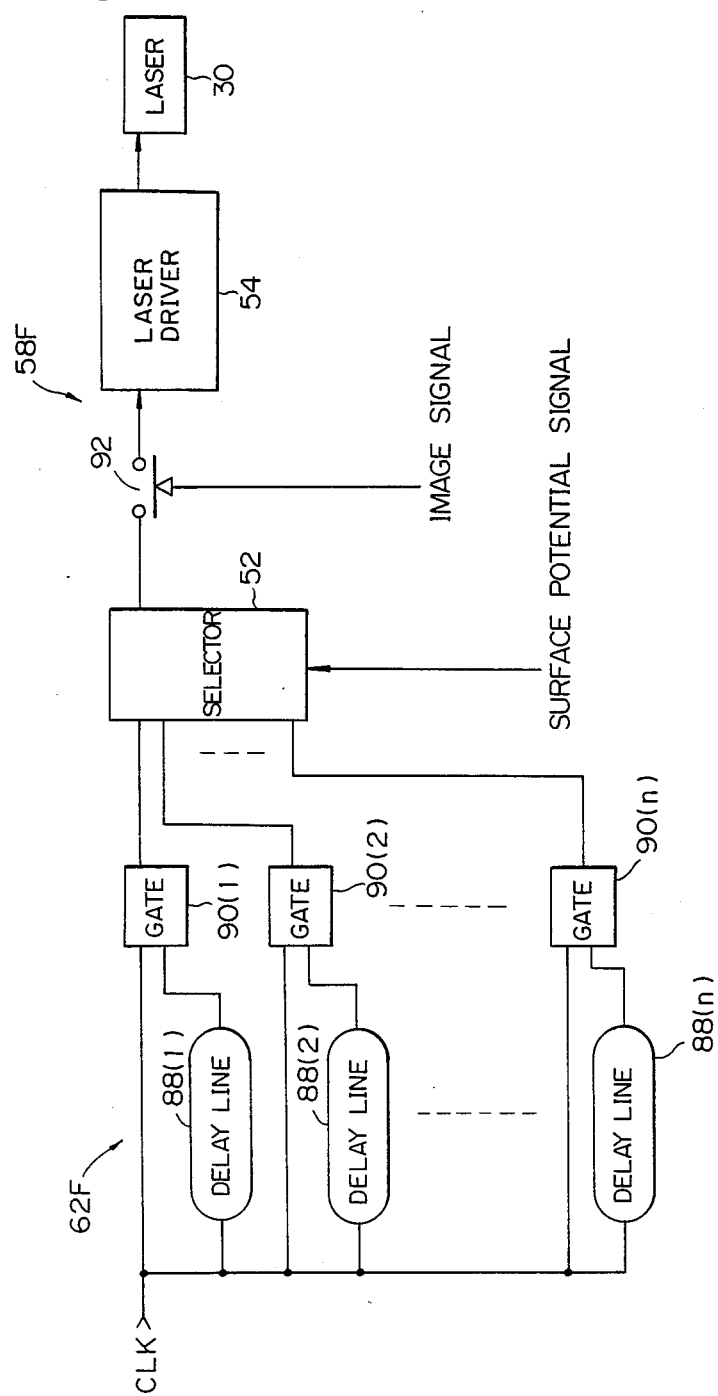
FIG. 28 is a schematic block diagram showing a laser beam control system representative of a sixth embodiment of the present invention.
Figure 29:
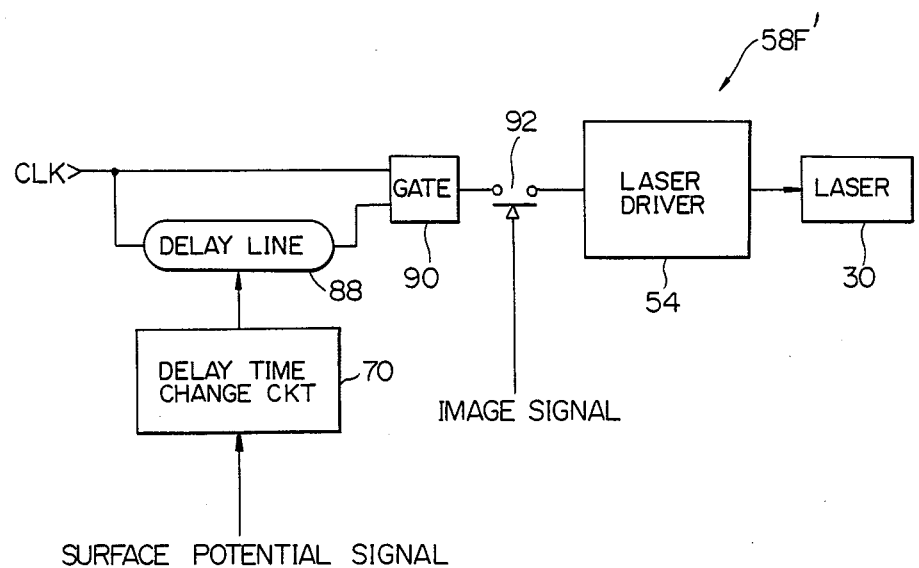
FIG. 29 is a schematic block diagram showing a modified form of the control system shown in FIG. 28.

A reference will be made to FIGS. 28 and 29 for describing a sixth embodiment and a modification thereof each being implemented as a one-dot two-level output laser printer. In FIG. 28, a laser beam control system 58F representative of the sixth embodiment comprises delay lines 88 (1) to 88 (n), a pulse width setting circuit 62F made up of AND or OR gates 90 (1) to 90 (n), the selector 52, the laser driver 54, and an analog switch 92 connected between the selector 52 and the laser driver 54. In FIG. 29, a modified laser beam control system 58F' comprises a delay line 88, an AND or OR gate 90, the delay time changing circuit 70, the laser driver 54, and the analog switch 92. In any of the constructions shown in FIGS. 28 and 29, a signal having a particular pulse width associated with a signal representative of a surface potential of the drum 16 is produced beforehand and is applied to the analog switch 92. The analog switch 92 is turned on and off by the image signal. More specifically, whether or not the set pulse width signal is to be fed to the laser driver 54 is determined by the image signal, whereby the laser beam issuing from the laser 30 is modulated. If desired, the analog switch 92 may be replaced with an AND gate, for example.

Seventh Embodiment

Figure 30:
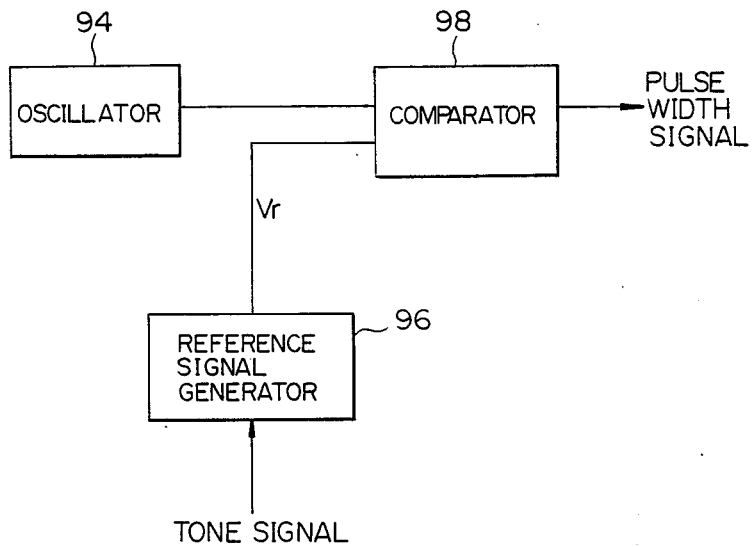
FIG. 30 is a schematic block diagram showing a laser beam control system representative of a seventh embodiment of the present invention.
Figures 31A, 31B:
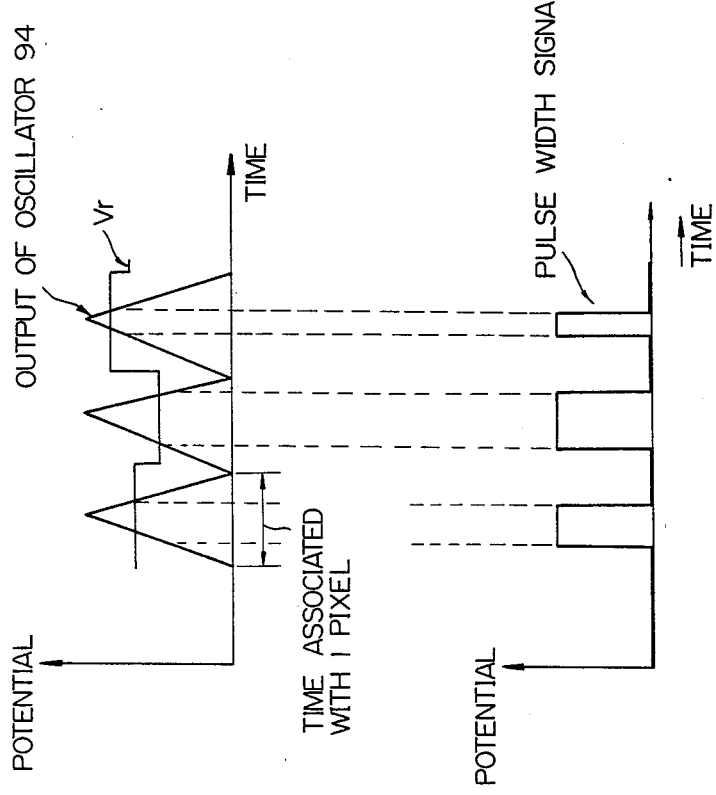
FIGS. 31A and 31B are diagrams demonstrating the operation of the control system shown in FIG. 30.

While the laser beam control systems shown and described have been implemented by delay lines, gates and selectors, they may be replaced with an alternative construction shown in FIG. 30, i.e., an oscillator 94, a reference signal generator 96, and a comparator 98. The reference signal generator 96 generates a reference signal Vr. In this alternative embodiment, as shown in FIGS. 31A and 31B, the oscillator 94 generates a signal having a rectangular or a saw-toothed waveform, for example, which varies with time. The oscillation frequency of the oscillator 94 defines the pixel frequency. Concerning a multi-level output laser printer adopting pulse width modulation, a tone signal is applied to the reference signal generator 96 so that the reference signal Vr (see FIG. 31A) is varied in association with the tone signal. The outputs of the oscillator 94 and reference signal generator 96 are fed to the comparator 98 which then outputs a signal undergone pulse width modulation as shown in FIG. 31B. In the case of a two-level output laser printer in which a tone signal is absent, a laser modulation signal is fed to the reference signal generator 96.

In the case where such a pulse width modulation circuit is used, a control system will be constructed as shown in FIG. 32. In FIG. 32, there are shown the laser driver 54 for driving the laser 30, the oscillator 94, a reference signal generator 96' for generating a reference signal V'r, the comparator 98, and a reference signal correcting circuit 100. The reference signal correcting circuit 100 produces a correction signal $\Delta V$ in response to a signal representative of the surface potential of the drum 16. The reference signal generator 96' adds the correction signal $\Delta V$ to the reference signal Vr shown in FIG. 31A, thereby outputting the reference signal V'r. This allows the pulse width to be changed depending upon the surface potential signal.

Eighth Embodiment

Figure 33:
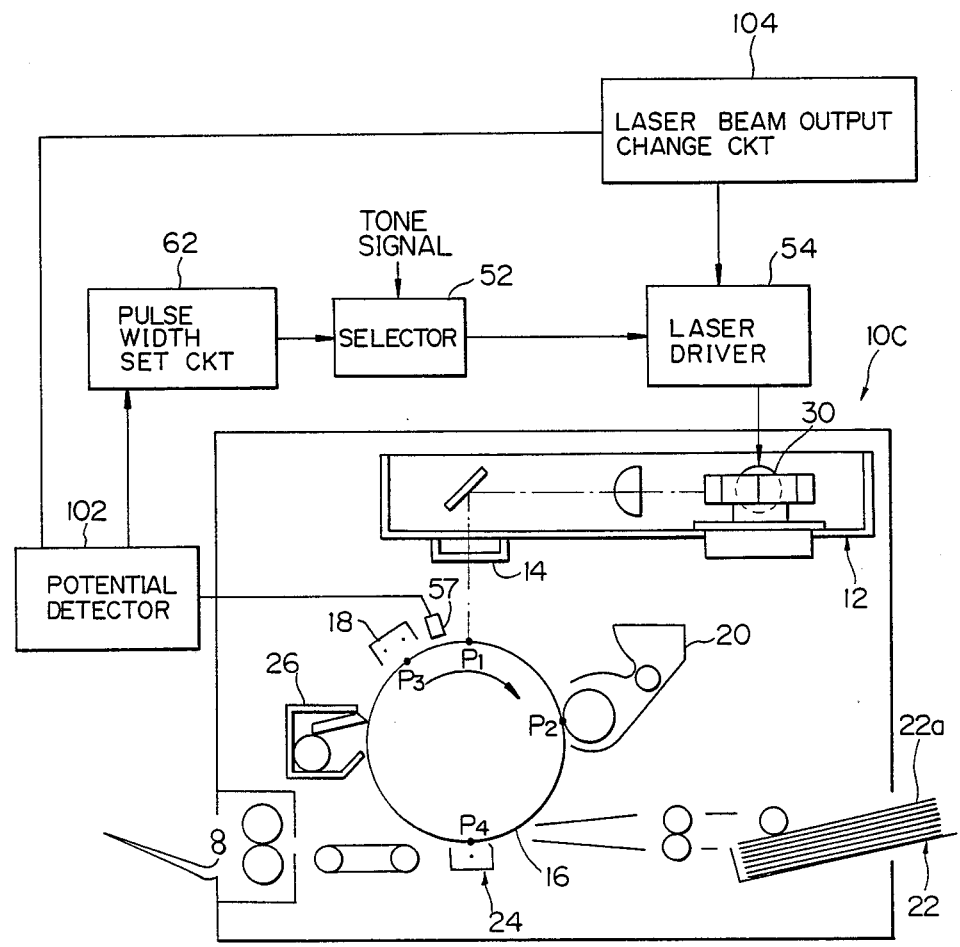
FIG. 33 is a schematic block diagram showing an eighth embodiment of the present invention and a laser beam control system associated therewith.
Figure 34:
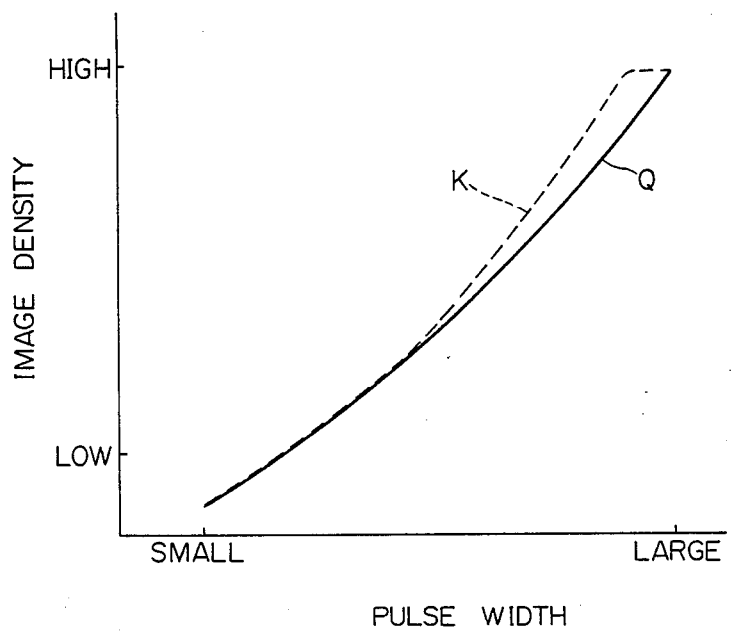
FIG. 34 is a graph showing the tone characteristic of an image density.

Referring to FIG. 33, a laser printer 10C representative of an eighth embodiment of the present invention has the previously described charge sensor 57 which is responsive to a charge potential on the surface of the drum 16. Specifically, the charge potential sensor 57 cooperates with a charge detector 102 to detect a charge potential on the drum 16. The laser 30 is driven on the basis of the detected charge potential via the pulse width setting circuit 62, selector 52, and laser driver 54, as in the preceding embodiments. When the charge potential on the drum 16 is lowered from the initial charge potential $V_{c0}$ to a potential of $V_{c1}$ due to aging, a laser beam output changing circuit 104 controls the laser driver 54 so as to reduce the laser beam output from the laser 30 in association with a decrement $\Delta V_c$ ($=V_{c0}-V_{c1}$). This allows the image density in a low density region (a region wherein the pulse width is comparatively small) to coincide with the initial image density. The tone characteristic of image density of that instant is indicated by a dotted curve K in FIG. 34. In FIG. 34, labeled Q (solid curve) is the initial characteristic. As shown FIG. 34, when the laser beam output is lowered, the density is reduced over the whole range, i.e., from the low density region to the high density region. Although the tone characteristic in the low density region may be made substantially the same as the initial tone characteristic Q, the tone characteristic in the high density region cannot be brought into coincidence with the characteristic Q.

It is therefore possible to make even the tone characteristic in the high density region equal to the initial characteristic Q by making the pulse widths associated with the high density region smaller than the initial pulse widths by the pulse width setting circuit 62, selector 52, and laser driver 54. For example, assuming that the initial charge potential $V_{c0}$ ($=-800$ volts) is lowered to $V_{c1}$ ($=-700$ volts) due to aging, the laser output and the pulse widths may be varied as shown in Table 1 below.

TABLE 1

| | CHARGE POTENTIAL (Vc) | BEAM OUTPUT | PULSE WIDTH (4-LEVEL) | | | |
|---|---|---|---|---|---|---|
| INITIAL | −800 v | 3.0 mW | 13 ns | 26 ns | 50 ns | 80 ns |
| AGED | −700 v | 2.7 mW | 13 ns | 26 ns | 46 ns | 70 ns |

In this instance, the preconditions are that the pixel density is 16 per millimeter, that the linear velocity of the drum 16 is 90 millimeters per second, that the effective scanning period ratio is 71.5 percent, that the pixel clock has a frequency of 10 megahertz, and that the one pixel turn-on width is 100 nanoseconds.

How the laser beam output changing circuit 104 changes the laser beam output in association with the outputs of the coactive surface potential sensor 57 and potential detector 102 will be described more specifically.

Figure 35:
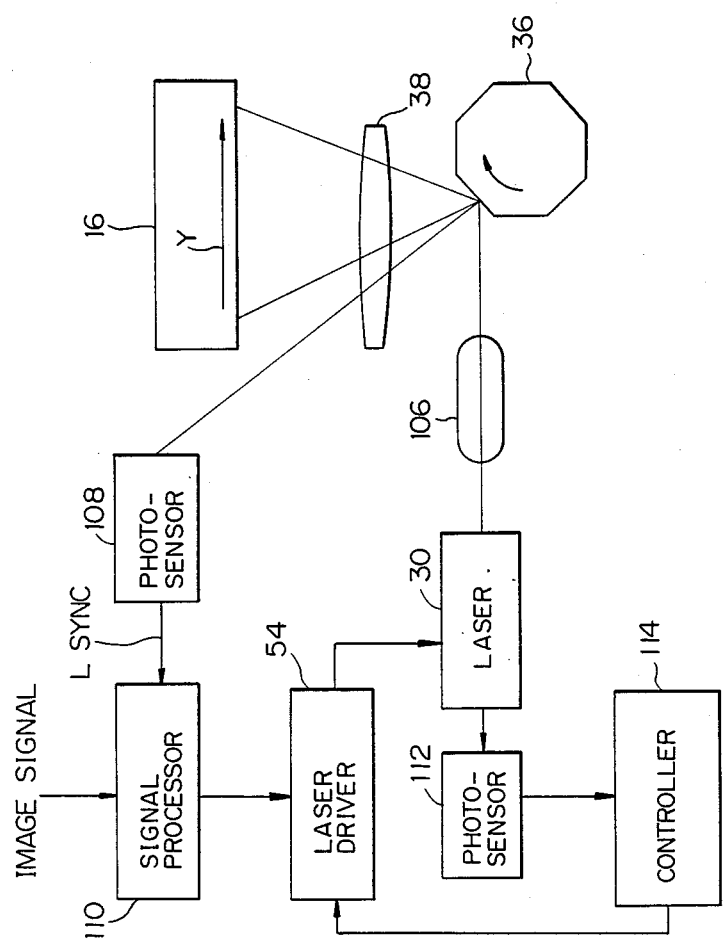
FIG. 35 is a schematic block diagram showing components which are associated with a laser beam output changing circuit shown in FIG. 33.

FIG. 35, there is shown an essential part of the illustrative embodiment which telates to the laser beam output changing circuit 104. A laser beam issuing from the semiconductor laser 30 is collimated by a collimating lens 106, then deflected by an optical scanning device in the form of the polygon mirror 36, and then focused by the f-theta lens 38 onto the charged surface of the drum 16. The beam spot on the drum 16 is repetitively shifted in the main scanning direction as indicated by an arrow Y while, at the same time, the drum 16 is rotated to effect subscanning. A photosensor 108 is located outside the image-forming area of the drum 16 with respect to the axial direction of the drum 16. The photosensor 108 generates a line synchronizing signal LSYNC by sensing the laser beam being deflected by the polygon mirror 36. A signal processor 110 feeds video data in the form of a data signal to the laser driver 54 while being controlled by the signal LSYNC from the photosensor 108 with respect to the timing. The laser driver 54 drives the laser 30 in response to the data signal from the signal processor 110. As a result, a laser beam modulated by the data signal forms an electrostatic latent image on the drum 16. The latent image is developed by the developing unit 20 and then transferred by the transferring unit 24 to the papaer sheet 22a.

A laser beam issuing rearward from the laser 30 is incident to another photosensor 112. The output of the photosensor 112 representative of the intensity of the laser beam is applied to a controller 114. In response, the controller 114 controls the laser driver 54 so that the quantity of light issuing from the laser 30 may remain constant. Sensing the intensity of light which issues rearward from the laser 30 as mentioned above is advantageous over a prior art system which directs a part of a laser beam issuing forward from a laser to a photosensor lowering the actually available intensity of a laser beam.

Figure 36:
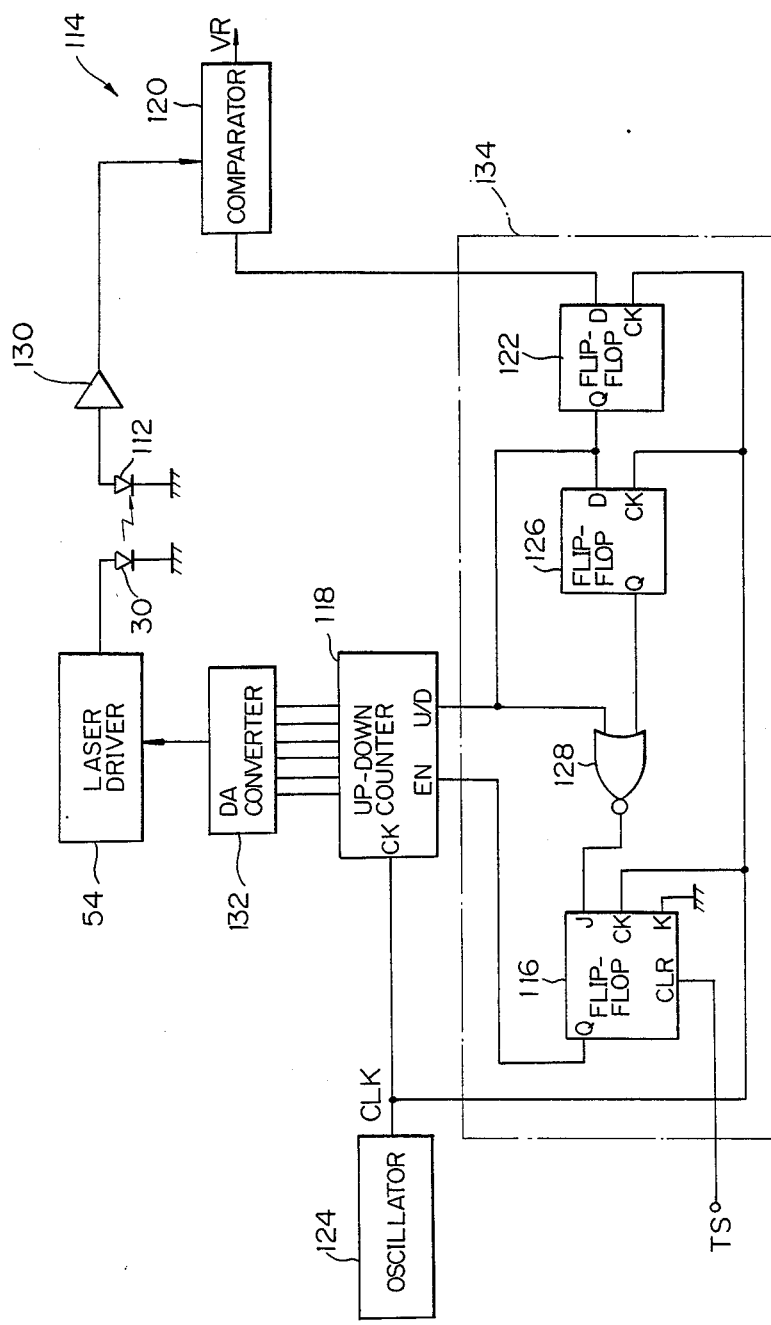
FIG. 36 is a schematic block diagram showing a more specific construction of the control circuit shown in FIG. 35.

FIG. 36 shows a specific construction of the controller 114. When a timing signal TS for causing an output control operation to begin is applied to the controller 114, a JK flip-flop 116 is cleared to turn its output level from high to low. This allows an up-down counter 118 to start counting. The output of a comparator 120 is latched by a D flip-flop 122 in response to a clock CLK from an oscillator 124. The output of the D flip-flop 122 is fed to the up-down counter 118 in the form of a count mode signal so as to control the counting mode of the latter. At the same time, the output of the D flip-flop 122 is latched by a D flip-flop 126 in response to the clock CLK from the oscillator 124. The non-inverted output of the D flip-flop 122 and the inverted output of the D flip-flop 126 are routed to a NOR gate 128. The JK flip-flop 116 is set by an output of the NOR gate 128.

The output of the photosensor 112 which is proportional to the intensity of the laser beam is amplified by an amplifier 130 and then applied to the comparator 120. The comparator 120 compares the amplified photosensor output with a reference voltage VR and, depending upon the result of comparison, produces either a high level signal or a low level signal. For example, when the up-down counter 118 is allowed to start counting by the timing signal TS while the output of the comprator 120 has a high level (i.e. while the output of the laser 30 is higher than the reference voltage VR), the up-down counter 118 operates as a down-counter in response to a high level output of the D flip-flop 122. A digital-to-analog (DA) converter 132 converts an output of the up-down counter 118. In response to an output of the DA converter 132, the drive current fed from laser driver 54 to the laser 30 is changed. In this case, the drive current through the laser 30 is reduced resulting in the output voltage of the amplifier 130 being lowered. As soon as the output of the comparator 120 turns from high to low, the output of the D flip-flop 122 turns from high to low and, therefore, the output of the NOR gate 128 turns from low to high. As a result, the JK flip-flop 116 is set to inhibit the up-down counter 118 from operating.

On the other hand, when the up-down counter 18 is allowed to operate by the timing signal TS while the output of the comparator 120 is low (i.e. while the output of the laser 30 is lower than the reference voltage VR), the up-down counter 118 operates in an up-count mode in response to a low level output of the D flip-flop 122. The DA converter 132 converts an output of the up-down counter 118 to an analog output. The drive current fed from the laser driver 54 to the laser 30 is changed on the basis of the output of the DA converter 132. In this case, the drive current is increased and, therefore, the output voltage of the amplifier 130 is raised. When the output of the comparator 120 turns from low to high, the output of the D flip-flop 122 is brought into a high level resulting in the up-down counter 118 operating as a down-counter. Since the output of the NOR gate 128 remains in a low level, the JK flip-flop 116 is not reset and allows the counter 118 to operate continuously. That is, the up-down counter 118 is not inhibited from operating when the output of the laser 30 is increased beyond the reference voltage VR and is inhibited only when the laser output is decreased beyond the reference voltage VR, whereby the drive current through the laser 30 is maintained constant.

Alternatively, an arrangement may be made such that the up-down counter 118 is not inhibited from operating when the laser output is decreased beyond the reference voltage VR and is inhibited when the laser output is increased beyond the reference voltage VR. This is also successful in maintaining the drive current through the laser 30 constant. More specifically, a part of the circuitry of FIG. 36 which is enclosed with a rectangle 134 serves as an edge detector which selectively inhibits the operation of the up-down counter 118. As described above, the output of the laser 30 is controlled such that the output voltage of the amplifier 130 remains constant with respect to the reference voltage VR. For details of this kind of output control means which uses a counter and a DA converter is disclosed, a reference may be made to Japanese Patent Laid-Open Publication Nos. 60-171863, 61-174786, and 61-174787 by way of example.

Figure 37:
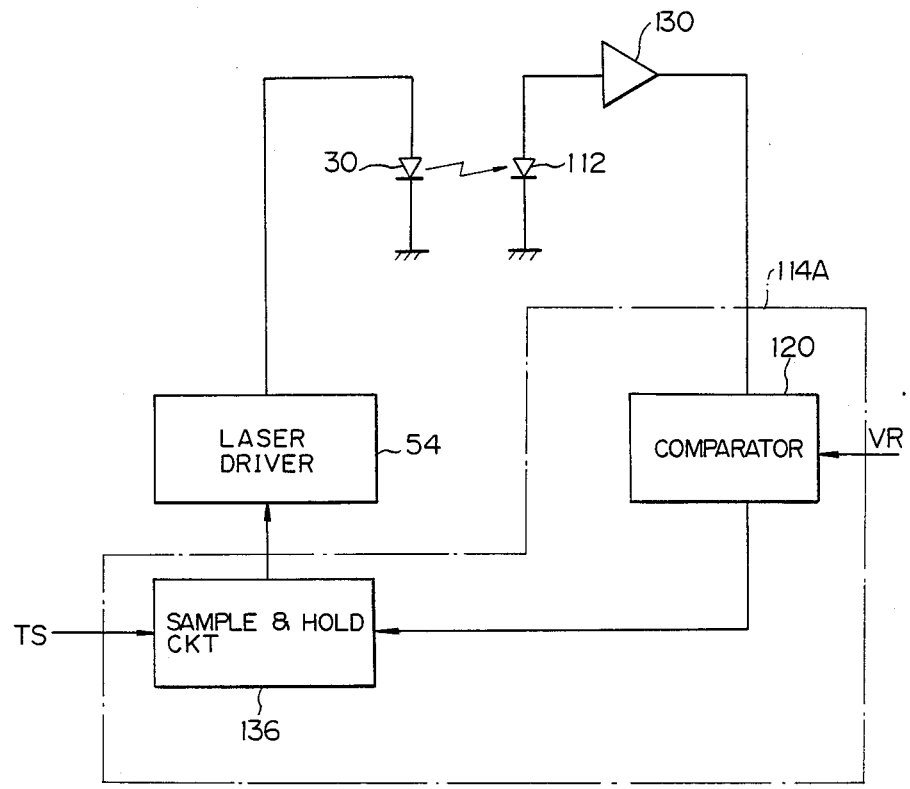
FIG. 37 is a schematic block diagram of a circuit for stabilizing a laser beam output.

FIG. 37 shows a control circuit 114A which stabilizes the laser output by a method different from the method discussed above with reference to FIG. 36. The control circuit 114A is entirely implemented as analog circuitry. As shown, the laser beam from the laser 30 is incident to the photosensor 11. The output of the photosensor 122 representative of the intensity of the laser beam is amplified by the amplifier 130 and then applied to the comparator 120. The comparator 120 compares the input with a reference voltage VR to produce an error signal. A sample and hold circuit 136 holds the error signal from the comparator 120 in response to a timing signal TS which commands power checking, the error signal being fed to the laser driver 54. In response to the error signal, the laser driver 54 increases or decreases the current through the laser 30 to thereby maintain the intensity of laser output constant.

In any of the control circuits 114 and 114A described above, the laser output is controlled such that the output of the amplifier 130 remains equal to the reference voltage VR. This maintains the intensity of the laser output constant. It follows that the reference intensity of the laser output is variable by changing the reference voltage VR.

Figure 38:
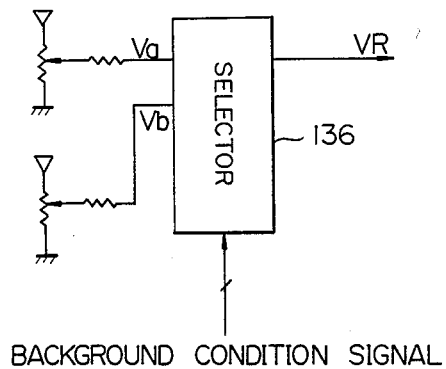
FIGS. 38, 39A and 39B are schematic block diagrams each showing a different construction of a system for selecting a reference beam intensity.

With this particular embodiment, it is also possible to correct a change in the condition of an image ascribable to a change in the condition of the background area on the drum 16 on the basis of an output of the surface potential senso 57 which is representative of the background condition on the drum 16. A relatively simple arrangement for implementing such correction is shown in FIG. 38. In FIG. 38, a plurality of predetermined voltages Va and Vb are applied to a selector 136 and are selectively fed out as the reference voltage VR in association with the output of the surface potential sensor 57. For more delicate correction, the output of the sensor 57 representative of a background condition may be fed to a computing unit so as to operate the selector 136 on the basis of an output of the computing unit.

Figure 39A:
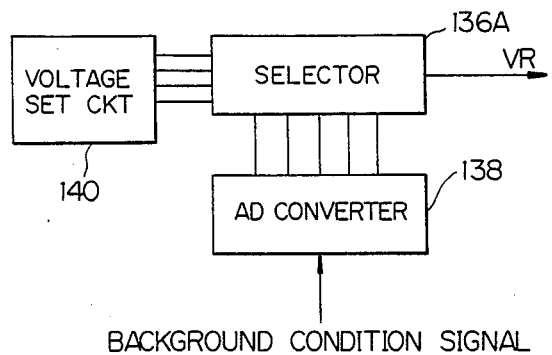
Figure 39B:
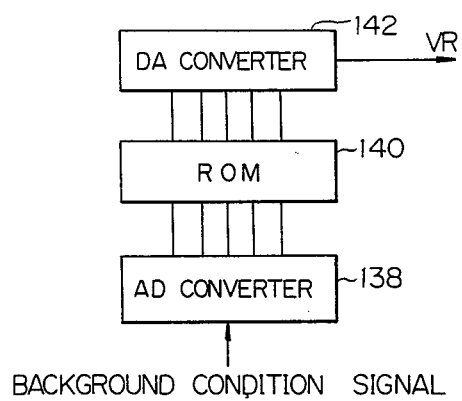

For example, as shown in FIG. 39A, the output of the surface potential sensor 57 responsive to a background condition is applied to a selector 136A in the form of digital data via an AD converter 138. A voltage setting circuit 140 prepares a plurality of voltages as selector data and applies them to the selector 136A. Hence, the selector 136A selects any one of the input voltages on the basis of the digital output of the AD converter 138 and feeds it out in the form of the reference voltage VR. In this instance, the multiple voltages produced by the voltage setting circuit 140 may be set independently of each other. FIG. 39B shows an alternative arrangement wherein the output of the surface potential sensor 57 converted to digital data by the AD converter 138 is fed to a ROM 140. The ROM 140 is loaded with output data which are individually associated with input data and data which are determined by the characteristics of the drum 16 and other factors. Addressed by the output of the AD converter 138, the ROM 140 produces new data, i.e., data associated with a correction curve. The new data is converted by a DA converter 142 to an analog signal which serves as the reference signal VR. Although the construction of FIG. 39B is somewhat complicated compared to the construction of FIG. 39A, it is capable of dealing with the characteristics of the drum 16 and other actors with greater flexibility and therefore can reproduce image more faithfully.

It is to be noted that the pulse width setting circuit shown in FIG. 33 may be implemented as the circuit 62B shown in FIG. 18 except that the output of the potential detecting circuit 102 shown in FIG. 33 should be applied to the delay time changing circuits 70a to 70c of FIG. 18.

Ninth Embodiment

Figure 40:
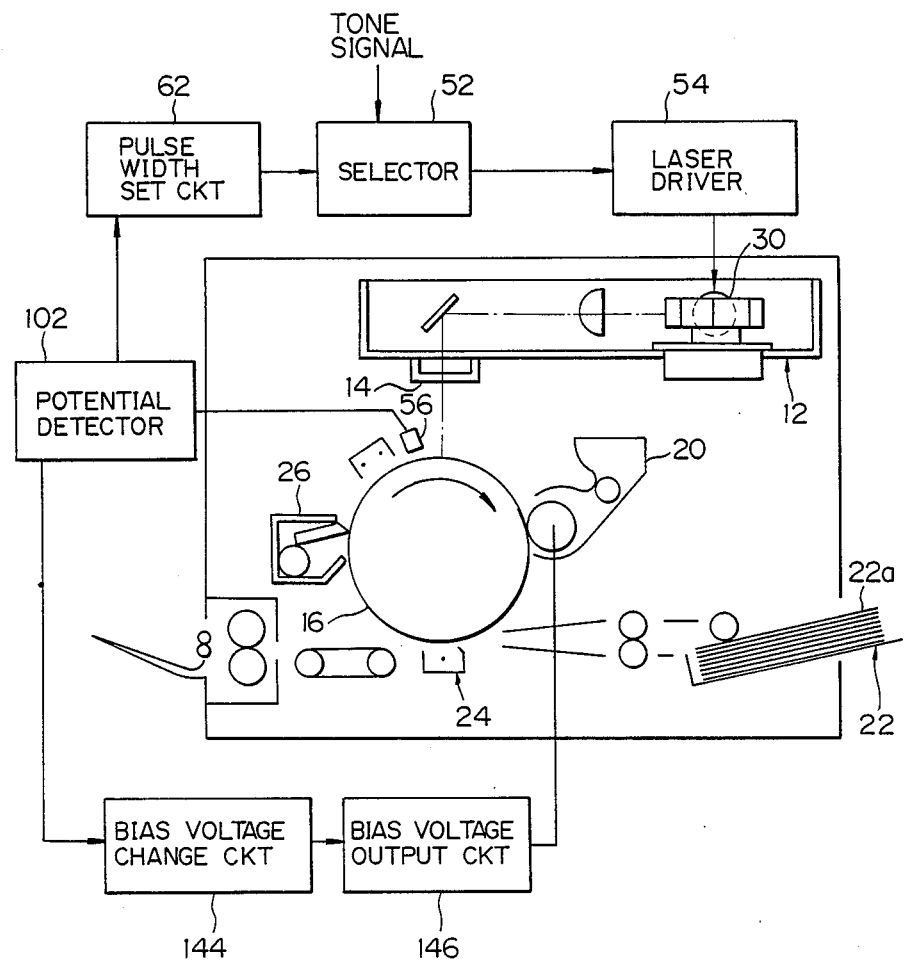
FIG. 40 is a schematic block diagram showing a ninth embodiment of the present invention and a laser beam control system associated therewith.

Referring to FIG. 40, a ninth embodiment of the present invention is shown which, like the embodiment of FIG. 40, detects the charge potential on the drum 16 by use of the coactive surface potential sensor 57 and potential detector 102. In response to the detected potential, the laser 30 is driven via the pulse width setting circuit 62, selector 52, and laser driver 54. When the charge potential on the drum 16 is lowered from the initial charge potential $V_{c0}$ to $V_{c1}$ due to aging, a bias voltage changing circuit 144 and a bias voltage outputing circuit 146 replaces a bias voltage $V_{b0}$ for development used in the initial stage with a bias voltage $V_{b1}$ ($= V_{b0} - V_{c0} + V_{c1}$), i.e., the bias voltage is lowered by substantially the same amount as the decrement $\Delta V_c$ ($= V_{c0} - V_{c1}$) of the charge potential. More specifically, as shown in FIG. 34, the density is substantially uniformly lowered throughout the low and high density regions by changing the bias voltage (the curve K of FIG. 34 shows that the density is substantially uniformly lowered in contrast to the curve A of FIG. 2). By comparing the curves K and Q of FIG. 34, it will be understood that changing the bias voltage is successful in controlling the tone characteristic in the low density region substantially to the initial tone characteristic but not successful in bringing the tone characteristic in the high density region to the initial characteristic. In the light of this, the pulse width setting circuit 62 and selector 52 cooperate to reduce the pulse widths lying in the comparatively large pulse width region. By operating the laser driver 54 by such reduced pulse widths, the tone characteristic in the high density region is successfully brought into coincidence with the initial characteristic.

Assuming that the initial charge voltage $V_{c0}$ ($= -800$ volts) is lowered to $V_{c1}$ ($= -700$ volts) due to aging by way of example, the bias voltage and the pulse widths may be changed as shown in Table 2 below.

TABLE 2

| | CHARGE POTENTIAL (Vc) | BIAS VOLTAGE | PULSE WIDTH (4-LEVEL) | | | |
|---|---|---|---|---|---|---|
| INITIAL | −800 v | −600 v | 13 ns | 26 ns | 50 ns | 80 ns |
| AGED | −700 v | −500 v | 13 ns | 26 ns | 46 ns | 70 ns |

The specific numerical values shown in Table 2 are available on condition that the pixel density is 16 per millimeter, the linear velocity of the drum 16 is 90 millimeters per second, the effective scanning period ratio is 71.5 percent, the pixel clock is 10 megahertz, and one pixel turn-on width is 100 nanoseconds.

In summary, it will be seen that the present invention provides an image forming apparatus which suppresses the variation of image density ascribable to the deterioration of the power of a laser beam and the sensitivity of a photoconductive element by changing the pulse width of a laser driving signal, the laser beam output, and the bias voltage for development.

Various modifications will become possible for those skilled in the art after receiving the teachings of the present disclosure without departing from the scope thereof. For example, the delay lines, AND or OR gates and selectors shown and described as constituting the means for setting pulse widths may be replaced with timers, one-shot multivibrators, voltage-controlled oscillators, etc. While some embodiments are constructed to sense the reflection density of a toner image formed on a photoconductive element, it may be the reflection density of an image transferred to a so-called image transfer belt that is to be sensed.

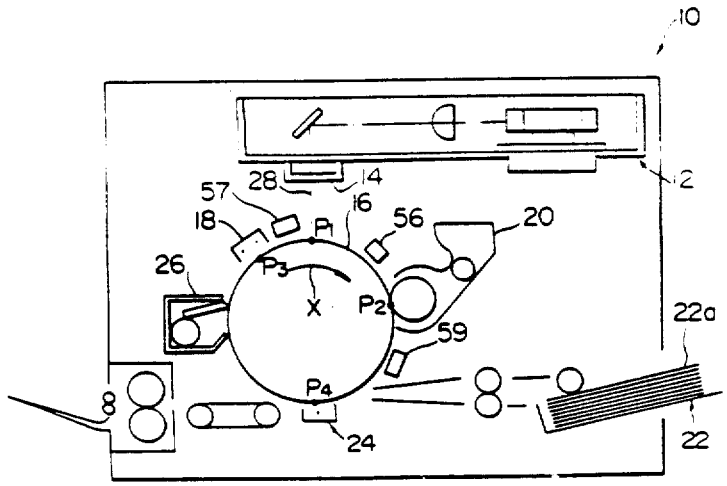

What is claimed is:

1. An apparatus for forming an electrostatic latent image representative of image information and a visible image of said latent image on an image carrier by illuminating said image carrier by a spot beam which is manipulated by an image forming signal associated with said image information, said apparatus comprising:
   sensor means for sensing a condition of said image carrier and producing an output signal representative of the sensed condition; and
   illumination time changing means for changing a duration of illumination of said image carrier by the spot beam in response to the output signal of said sensor means.

2. An apparatus as claimed in claim 1, wherein the spot beam comprises a laser beam issuing from a laser and modulated by the image forming signal.

3. An apparatus as claimed in claim 2, wherein said illumination time changing means comprises pulse width changing means for changing set pulse widths of the image forming signal in response to the output signal of said sensor means.

4. An apparatus as claimed in claim 3, wherein said sensor means comprises a surface potential sensor for sensing a surface potential of the latent image which is formed on said image carrier by causing the laser beam to scan said image carrier.

5. An apparatus as claimed in claim 3, wherein said sensor means comprises a reflection density sensor for sensing a reflection density of the visible image which is formed on said image carrier by causing the laser beam to scan said image carrier.

6. An apparatus as claimed in claim 3, further comprising laser beam output changing means for changing an output of the laser beam from said laser in response to the output signal of said sensor means.

7. An apparatus as claimed in claim 6, wherein said sensor means comprises a charge potential sensor for sensing a charge potential on said image carrier.

8. An apparatus as claimed in claim 6, wherein said sensor means comprises a reflection density sensor for detecting a density of a background area of the image which is formed on said image carrier.

9. An apparatus as claimed in claim 3, further comprising bias voltage applying means for applying a bias voltage for development to developing means which forms the visible image on said image carrier, and bias voltage changing means for changing the bias voltage in response to the output signal of said sensor means.

10. An apparatus as claimed in claim 9, wherein said sensor means comprises a charge potential sensor for sensing a charge potential on said image carrier.

11. An apparatus as claimed in claim 8, wherein said sensor means comprises a reflection density sensor for detecting a density of background area of the image which is formed on said image carrier.

* * * * *

UNITED STATES PATENT AND TRADEMARK OFFICE
CERTIFICATE OF CORRECTION

PATENT NO. : 4,914,459  
DATED : Apr. 3, 1990  
INVENTOR(S) : Takashi Mama, et al It is certified that error appears in the above-indentified patent and that said Letters Patent is hereby corrected as shown below:

The title page, should be deleted to be replaced with the attached title page.

Signed and Sealed this

Third Day of August, 1993

Attest:

MICHAEL K. KIRK

Attesting Officer

Acting Commissioner of Patents and Trademarks

United States Patent [19]

Mama et al.

[11] Patent Number: 4,914,459
[45] Date of Patent: Apr. 3, 1990

[54] IMAGE FORMING APPARATUS

[75] Inventors: Takashi Mama, Yokohama; Kenichirou Asada, Tokyo; Takanobu Fujioka, Tokyo; Yoshio Kaneko, Tokyo; Masaaki Kogure, Asaka, all of Japan

[73] Assignee: Ricoh Company, Ltd., Tokyo, Japan

[21] Appl. No.: 338,273

[22] Filed: Apr. 14, 1989

[30] Foreign Application Priority Data

Apr. 18, 1988 [JP] Japan .................. 63-93593
Apr. 28, 1988 [JP] Japan .................. 63-104230
May 11, 1988 [JP] Japan .................. 63-112620

[51] Int. Cl.⁴ .................................. G01D 15/00
[52] U.S. Cl. .................................. 346/160; 346/154
[58] Field of Search .......... 346/160.1, 107 R, 108, 346/160, 154; 369/106, 116

[56] References Cited

U.S. PATENT DOCUMENTS 4,283,785 8/1981 Miyauchi et al. .................. 369/116

Primary Examiner—Arthur G. Evans
Attorney, Agent, or Firm—Oblon, Spivak, McClelland, Maier & Neustadt

[57] ABSTRACT

An electrophotographic copier, facsimile machine, laser printer or similar image forming apparatus for reproducing an image on a paper sheet by transforming an image signal representative of the image into an image forming signal by pulse width modulation, causing a spot beam in the form of a laser beam which is modulated by the image forming signal to scan a photoconductive element to form an electrostatic latent image thereon, developing the latent image to render it visible, and transferring the visible image to a paper sheet. The laser beam output, the set pulse widths of the image forming signal (beam turn-on times) and the bias voltage for development are changed in association with the deterioration of the laser beam power and the sensitivity of the photoconductive element.

11 Claims, 33 Drawing Sheets